US012631072B2

(12) United States Patent　　(10) Patent No.:　US 12,631,072 B2
Becker　　(45) Date of Patent:　May 19, 2026

(54) MANUFACTURING METHODS FOR DUAL CONCENTRIC TUBING

(71) Applicant: DUCON—BECKER SERVICE TECHNOLOGY, LLC, Ventura, CA (US)

(72) Inventor: Billy G. Becker, Ventura, CA (US)

(73) Assignee: DUCON—BECKER SERVICE TECHNOLOGY, LLC, Ventura, CA (US)

( * ) Notice: Subject to any disclaimer, the term of this patent is extended or adjusted under 35 U.S.C. 154(b) by 0 days.

(21) Appl. No.: 18/808,617

(22) Filed: Aug. 19, 2024

(65) Prior Publication Data

US 2024/0410235 A1　　Dec. 12, 2024

Related U.S. Application Data

(63) Continuation of application No. 17/438,983, filed as application No. PCT/US2020/024247 on Mar. 23, 2020, now Pat. No. 12,065,891.

(60) Provisional application No. 62/829,139, filed on Apr. 4, 2019.

(51) Int. Cl.
　　*E21B 17/04*　　(2006.01)
　　*F16L 9/18*　　(2006.01)
　　*F16L 39/00*　　(2006.01)
(52) U.S. Cl.
　　CPC ................ *E21B 17/04* (2013.01); *F16L 9/18* (2013.01); *F16L 39/005* (2013.01)
(58) Field of Classification Search
　　CPC ...... E21B 17/04; E21B 43/121; E21B 17/042; E21B 17/18; F16L 9/18; F16L 39/005
　　See application file for complete search history.

(56) References Cited

U.S. PATENT DOCUMENTS

| 1,687,317 | A | * | 10/1928 | Archer | ................. E21B 43/123 |
| | | | | | 251/297 |
| 1,890,720 | A | * | 12/1932 | Chenault | ............... E21B 43/122 |
| | | | | | 417/86 |
| 2,142,484 | A | * | 1/1939 | Jennings | ............... E21B 43/122 |
| | | | | | 417/147 |
| 2,537,605 | A | * | 1/1951 | Sewell | .................... E21B 21/12 |
| | | | | | 175/324 |

(Continued)

FOREIGN PATENT DOCUMENTS

WO　　　2020162986　　　8/2020

OTHER PUBLICATIONS

International Search Report and Written Opinion dated dated Feb. 4, 2020, in related/corresponding PCT Application No. PCT/US2019/054387.

(Continued)

*Primary Examiner* — Steven A Macdonald

(74) *Attorney, Agent, or Firm* — Morgan, Lewis & Bockius LLP

(57)　　　　ABSTRACT

A method for manufacturing a joint pipe element (300) of a well system includes providing (1900) an outer pipe (340) having a bore (341); providing (1902) an inner pipe (330) having a bore (331); placing (1904) the inner pipe (330) in the bore (341) of the outer pipe (340); and connecting (1906) the inner pipe (330) to the outer pipe (340) with a connecting mechanism (360) so that a rotational torque is transferred from the outer pipe to the inner pipe.

16 Claims, 25 Drawing Sheets

(56)  References Cited

U.S. PATENT DOCUMENTS

| | | | | |
|---|---|---|---|---|
| 2,589,668 | A * | 3/1952 | Coberly | E21B 43/12 |
| | | | | 417/38 |
| 2,678,605 | A * | 5/1954 | Tappmeyer | E21B 43/122 |
| | | | | 166/54.1 |
| 3,065,807 | A * | 11/1962 | Wells | E21B 17/18 |
| | | | | 166/241.1 |
| 3,216,512 | A * | 11/1965 | Grable | E21B 21/01 |
| | | | | 175/171 |
| 3,489,438 | A * | 1/1970 | McClure | E21B 17/18 |
| | | | | 175/215 |
| 3,638,970 | A * | 2/1972 | Sandquist | F16L 37/10 |
| | | | | 285/123.1 |
| 3,664,441 | A | 5/1972 | Carey | |
| 3,664,443 | A * | 5/1972 | Campbell | E21B 17/18 |
| | | | | 175/215 |
| 3,786,878 | A * | 1/1974 | Chapman | F16L 39/005 |
| | | | | 175/215 |
| 3,943,618 | A | 3/1976 | Perkins | |
| 4,067,596 | A | 1/1978 | Kellner et al. | |
| 4,071,101 | A * | 1/1978 | Ford | E21B 17/1064 |
| | | | | 175/325.3 |
| 4,100,981 | A | 7/1978 | Chaffin | |
| 4,149,739 | A * | 4/1979 | Morris | E02F 7/10 |
| | | | | 285/334 |
| 4,446,917 | A * | 5/1984 | Todd | E21B 36/005 |
| | | | | 166/61 |
| 4,751,968 | A * | 6/1988 | Ames | E21B 33/043 |
| | | | | 166/368 |
| 4,988,389 | A * | 1/1991 | Adamache | E21B 47/006 |
| | | | | 166/61 |
| 4,997,048 | A | 3/1991 | Isom | |
| 5,139,090 | A | 8/1992 | Land | |
| 5,246,273 | A * | 9/1993 | Rosar | E21B 43/28 |
| | | | | 175/45 |
| 5,730,220 | A * | 3/1998 | Ganelin | E21B 43/34 |
| | | | | 166/372 |
| 5,733,113 | A * | 3/1998 | Grupping | E21B 43/129 |
| | | | | 418/188 |
| 5,775,736 | A | 7/1998 | Svetlik | |
| 5,806,598 | A | 9/1998 | Amani | |
| 5,911,278 | A | 6/1999 | Reitz | |
| 6,305,476 | B1 | 10/2001 | Knight | |
| 6,382,321 | B1 * | 5/2002 | Bates | E21B 43/124 |
| | | | | 417/172 |
| 6,405,800 | B1 * | 6/2002 | Walker | E21B 43/12 |
| | | | | 166/278 |
| 7,134,514 | B2 * | 11/2006 | Riel | E21B 47/06 |
| | | | | 175/320 |
| 8,539,976 | B1 | 9/2013 | Rodgers, Jr. et al. | |
| 8,777,273 | B2 * | 7/2014 | Syse | E21B 17/18 |
| | | | | 285/379 |
| 10,718,457 | B2 * | 7/2020 | Haynes | F16L 15/04 |
| 2002/0066578 | A1 * | 6/2002 | Broome | E21B 43/08 |
| | | | | 166/227 |
| 2003/0042048 | A1 * | 3/2003 | Hughes | E21B 21/12 |
| | | | | 175/57 |
| 2003/0164240 | A1 | 9/2003 | Vinegar et al. | |

| | | | | |
|---|---|---|---|---|
| 2003/0178198 | A1 * | 9/2003 | Turner | E21B 43/14 |
| | | | | 166/387 |
| 2003/0221839 | A1 * | 12/2003 | Turner | E21B 43/14 |
| | | | | 166/374 |
| 2004/0094304 | A1 * | 5/2004 | Turner | E21B 43/088 |
| | | | | 166/321 |
| 2004/0182437 | A1 | 9/2004 | Messick | |
| 2005/0061369 | A1 | 3/2005 | De Almeida | |
| 2006/0283606 | A1 | 12/2006 | Partouche et al. | |
| 2007/0227739 | A1 | 10/2007 | Becker et al. | |
| 2007/0235197 | A1 | 10/2007 | Becker et al. | |
| 2008/0041582 | A1 * | 2/2008 | Saetre | E21B 43/12 |
| | | | | 166/205 |
| 2009/0008078 | A1 * | 1/2009 | Patel | E21B 34/10 |
| | | | | 166/313 |
| 2009/0183873 | A1 * | 7/2009 | Bunnell | E21B 43/12 |
| | | | | 166/278 |
| 2011/0067883 | A1 | 3/2011 | Falk et al. | |
| 2011/0259597 | A1 | 10/2011 | Bjerke | |
| 2014/0041863 | A1 | 2/2014 | Dowling et al. | |
| 2014/0116725 | A1 | 5/2014 | Wollmann | |
| 2014/0179448 | A1 | 6/2014 | Collins et al. | |
| 2014/0284065 | A1 * | 9/2014 | Fraignac | E21B 17/042 |
| | | | | 166/242.6 |
| 2015/0047837 | A1 * | 2/2015 | Turner | E21B 43/12 |
| | | | | 166/254.2 |
| 2015/0098794 | A1 * | 4/2015 | Baski | F04D 29/086 |
| | | | | 415/1 |
| 2015/0176373 | A1 * | 6/2015 | McGeoch | E21B 21/003 |
| | | | | 166/227 |
| 2015/0292294 | A1 * | 10/2015 | Grubert | E21B 43/04 |
| | | | | 166/191 |
| 2015/0315869 | A1 | 11/2015 | Landry | |
| 2017/0370162 | A1 * | 12/2017 | Carrois | E21B 17/042 |
| 2018/0030812 | A1 * | 2/2018 | Ning | E21B 43/16 |
| 2018/0280834 | A1 * | 10/2018 | Marshall | B01D 19/0042 |
| 2018/0320492 | A1 | 11/2018 | Shen et al. | |
| 2019/0309768 | A1 * | 10/2019 | Todd | E21B 43/35 |
| 2019/0316719 | A1 * | 10/2019 | Haynes | F16L 39/005 |
| 2019/0376369 | A1 | 12/2019 | Daniel et al. | |
| 2020/0208496 | A1 * | 7/2020 | Veselka | E21B 43/086 |
| 2020/0318452 | A1 * | 10/2020 | Becker | E21B 17/042 |
| 2021/0293094 | A1 * | 9/2021 | Al-Mousa | E21B 17/003 |
| 2022/0120144 | A1 * | 4/2022 | Becker | E21B 17/18 |
| 2022/0154561 | A1 * | 5/2022 | Becker | E21B 43/123 |
| 2022/0162916 | A1 * | 5/2022 | Becker | E21B 43/121 |

OTHER PUBLICATIONS

International Preliminary Report on Patentability, PCT/US2019/054387, dated Aug. 10, 2021.

International Preliminary Report on Patentability, PCT/US2020/024247, dated Sep. 28, 2021.

International Search Report / Written Opinion dated Jun. 22, 2020, in related/corresponding PCT Application No. PCT/US2020/024230.

International Preliminary Report on Patentability, PCT/US2020/024230, dated Sep. 28, 2021.

* cited by examiner

PROVIDING AN OUTER PIPE HAVING A BORE ~1900

PROVIDING AN INNER PIPE HAVING A BORE ~1902

PLACING THE INNER PIPE IN THE BORE OF THE OUTER PIPE ~1904

CONNECTING THE INNER PIPE TO THE OUTER PIPE SO THAT A ROTATIONAL TORQUE IS TRANSFERRED FROM THE OUTER PIPE TO THE INNER PIPE ~1906

MANUFACTURING METHODS FOR DUAL CONCENTRIC TUBING

BACKGROUND

Technical Field

Embodiments of the subject matter disclosed herein generally relate to well artificial gas lift systems, and more specifically, to methods for manufacturing various elements of a dual concentric tubing system that is used to lift a fluid from a well.

Discussion of the Background

For bringing the oil and/or gas or any other fluid from an underground formation to the surface, a well is drilled to a desired depth relative to the surface, and a casing to protect the wellbore is installed (i.e., cemented in place, and perforated for connecting the wellbore to the subterranean formation). Then, a tubing system is assembled and lowered into the well for lifting the oil. The typical tubing system has a single tubing string (a long conduit made of plural short pipes attached to each other) that is used either to take the oil to the surface or to pump a pressured gas and lift the oil through an annulus formed between the single tubing string and the casing of the well.

However, more recent systems as disclosed in U.S. Provisional Patent Application No. 62/801,396 (filed on Feb. 5, 2019, and assigned to the assignee of this application, the entire disclosure of which is incorporated herein by reference), use modified tubing strings that employ three or more fluid conduits that are independent of each other. Thus, there is a need for a method for manufacturing such a tubing system that uses more than two conduits for extracting a fluid from the well.

An artificial lift method that was only applied in the field as a solution to unloading gas wells that were offline as a result of having standing fluid levels above the perforations in a vertical well is the Calliope system, which is schematically illustrated in FIG. 1 (which corresponds to FIG. 5 of U.S. Pat. No. 5,911,278). The Calliope system 100 utilizes a dedicated gas compressor 102 to lower the producing pressures (compressor suction) a well 104 must overcome while using the high pressure discharge from the compression (compressor discharge) as a source of gas lift. The Calliope system was successful at taking previously dead gas wells and returning them to economic production levels and improving gas recoveries from the reservoir. Each wellsite installation has a programmable controller (not shown) that operates a manifolded system (which includes plural valves 110A to 110J) to automate the connection of the compressor suction to the casing 120, production tubing 130, and/or an inner tubing 140, or conversely, to connect the compressor discharge to these elements. Various pressure gauges 112A to 112O are used to determine when to open or close the various valves 110A to 110J. The production tubing 130 has a one-way valve 132 that allows a fluid from the casing 120 to enter the lower part of the production tubing 130 and the inner tubing 140, but not the other way. The fluid flows from the formation 114 into the casing 120, through holes 116, made during the perforating operation, into the casing production tubing annulus. By connecting the discharge and suction parts of the compressor 102 to the three tubes noted above, the fluid from the bottom of the well 104 is pumped up the well, to a production pipe 106.

However, the configuration shown in FIG. 1 does not provide any detail about how the production pipe and the inner tubing are formed and assembled. The traditional methods uses to assembly first the production pipe, lower it into the well, then assemble the inner tubing, and lower the inner tubing into the production pipe. This process uses independent pipes that are attached to each other in the field, one by one. However, such a process is tedious and expensive. Thus, there is a need for a method that efficiently and easily connects various pipes to each other to form a single unit, and the plural single units are then connected to each other to form at once the tubing system.

SUMMARY

According to an embodiment, there is a method for manufacturing a joint pipe element of a well system, and the method includes providing an outer pipe having a bore, providing an inner pipe having a bore, placing the inner pipe in the bore of the outer pipe, and connecting the inner pipe to the outer pipe with a connecting mechanism so that a rotational torque is transferred from the outer pipe to the inner pipe.

According to another embodiment, there is a joint pipe element for a well system, and the joint pipe element includes an outer pipe having a bore, an inner pipe having a bore, wherein the inner pipe is located in the bore of the outer pipe, and a connecting mechanism located between the inner pipe and the outer pipe so that a rotational torque is transferred from the outer pipe to the inner pipe. A first end of the outer pipe is upset forged to have a thickness larger than a remainder of the outer pipe, and a corresponding first end of the inner pipe is not upset forged.

According to still another embodiment, there is a method for manufacturing a joint pipe element of a well system, and the method includes providing an outer pipe having a bore, providing an inner pipe having a bore, providing a connector, attaching a first end of the inner pipe and a first end of the outer pipe to the connector, and connecting a second end of the inner pipe to a second end of the outer pipe with a connecting mechanism so that a rotational torque is transferred from the outer pipe to the inner pipe.

According to yet another embodiment, there is a joint pipe element for a well system, and the joint pipe element includes an outer pipe having a bore, an inner pipe having a bore, wherein the inner pipe is located in the bore of the outer pipe, a connector connected to the outer pipe and to the inner pipe, and a connecting mechanism located between the inner pipe and the outer pipe so that a rotational torque is transferred from the outer pipe to the inner pipe.

According to another embodiment, there is a method for manufacturing a connector for a well system, and the method includes forming, in a single solid piece of material, an annulus A and an annulus B, wherein the annulus A is independent of the annulus B; and making identical threads in the annuli A and B, where the annuli A and B are concentric.

According to still another embodiment, there is a connector for connecting two elements of a well system, and the connector includes a single solid piece of material having an annulus A and an annulus B, wherein the annulus A is independent of the annulus B; and identical threads made in each end of the annuli A and B, where the annuli A and B are concentric.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a joint pipe element that includes two concentric pipes. However, the embodiments discussed herein are also applicable to a connector or other tools associated with the joint pipe element, and also to a joint pipe element that includes more than two concentric pipes.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Before discussing the novel method of manufacturing the joint pipe element, a short discussion of a dual-string, concentric, tubing system that uses joint pipe elements is believed to be in order.

Figure 1:
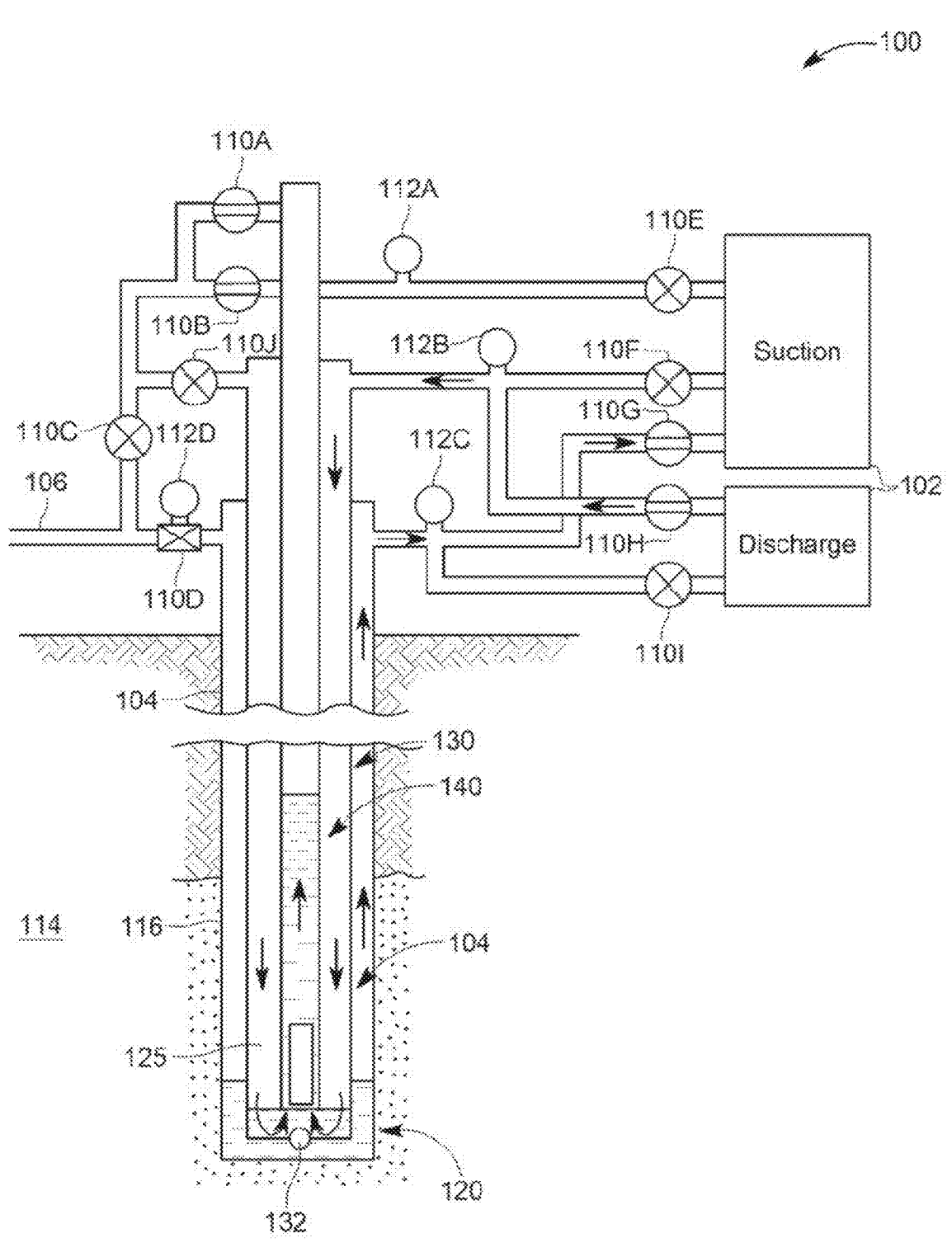
FIG. 1 illustrates a wellhead of a well and associated tubing strings that are placed in the well.
Figure 2:
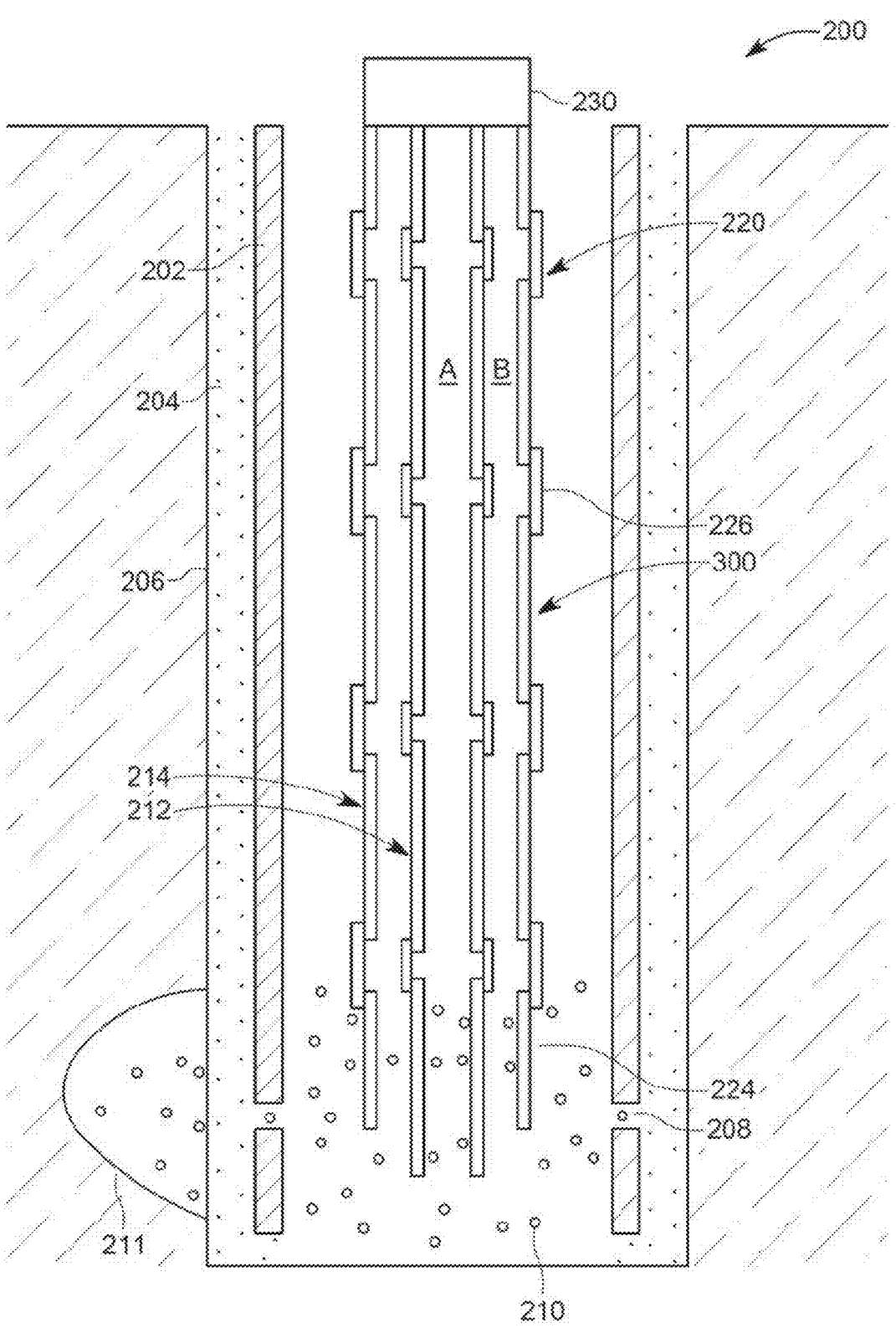
FIG. 2 illustrates a well and associated tubing system that has an inner tubing string and an outer tubing string placed inside a casing of the well.

FIG. 2 shows a well system 200 having a casing 202. Casing 202 has been cemented with cement 204 inside the borehole 206. Plural perforations 208 have been made in the casing, at least at the bottom of the well (in fact, these perforations are formed at various stages of the casing) so that oil 210 from the one or more formations 211 around the well 206 is flowing inside the casing 202. A tubing system 220 has been lowered into the casing 202 to artificially lift the oil. The tubing system is attached to a wellhead adaptor 230. The tubing system 220 is made of plural joint pipe elements 300, which are discussed in FIG. 3. The number of the joint pipe elements may be any integer equal to or larger than 2. The most distal joint pipe element 224 may have a configuration different from the joint pipe element 300, as discussed later.

The dual simultaneous connection between two joint pipe elements can also be achieved by using a connector 226 (i.e., a single housing or a dual housing connector; the term "connector" is used herein to refer to either of these two connectors) as shown in FIG. 2. The dual housing connector 226 connects simultaneously to both the inner and outer pipes of a joint pipe element. A single housing connector (not shown) connects only to the inner pipe or only to the outer pipe of a joint pipe element. The most distal joint pipe element 224 (e.g., the chamber pump or a mandrel) may be connected at its upstream end to the double housing connector 226, while its downstream end may have no connection. When the joint pipe elements 300 and the dual housing connectors 226 are all connected to each other, they form an inner tubular string 212 and an outer tubular string 214. The inner tubular string 212 has a continuous bore A, which is called herein annulus A, and the outer tubular string 214 defines together with the inner tubular string 212 an annulus B. The annulus B is concentric to the annulus A. The pressure in each of the tubular strings can be controlled independently of the other tubular string.

Figure 3:
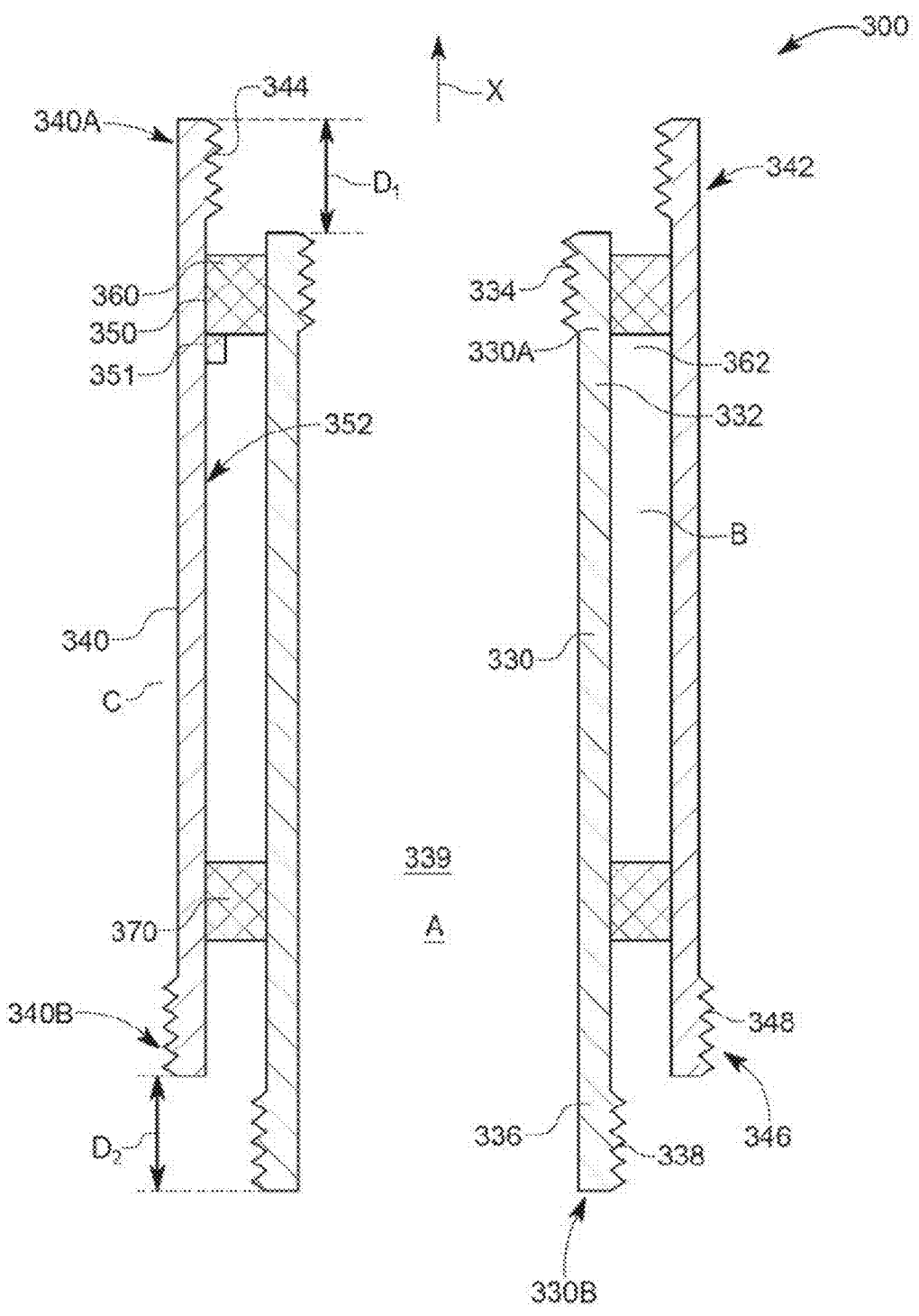
FIG. 3 illustrates a joint pipe element that when assembled with another joint pipe element creates at once the inner and outer tubing strings.

FIG. 3 shows a single joint pipe element 300 having an inner pipe 330 and an outer pipe 340. The upstream end 340A of the outer pipe 340 is shaped as a tubular box 342. This box can be formed, for example, by upsetting or forging (or other known processes). In this embodiment, an internal thread (female) 344 is formed on the internal part of the tubular box 342. The downstream end 340B of the outer pipe 340 is shaped as a tubular pin 346 having an external thread (male) 348, that would mate with a corresponding thread 344 of a next joint pipe element (not shown).

Two or more upstream connecting mechanisms 360 are attached (for example, welded) to the inner pipe 330 as shown in FIG. 3. A connecting mechanism may be a lug. The term "lug" is used herein to include any means for connecting the inner pipe to the outer pipe in order to transfer rotational torque and/or share tensile and compression loads. This term may include, but is not limited to, a slug, a weld, a centralizer, or a full or partial length feature on the inner or outer string, or a combination of features and other parts. Further, the term may include a key formed in one pipe and an extension or shoulder formed in the other pipe, such that the extension or shoulder is configured to engage the key. Other similar or equivalent mechanisms are intended to be included in this term as long as the two pipes are attached to each other in such a way to transfer rotational torque from the outer pipe to the inner pipe and/or share tensile and compression loads. Note that FIG. 3 shows only a single upstream lug 360 as this figure is a longitudinal cross-section view of the joint pipe element 300. However, more or less lugs may be placed between the pipes, on a circumference of the inner pipe. The shape of these lugs may be selected as necessary by the manufacturer of the joint pipe element. The inner pipe 330 is shown having a bore, called herein annulus A as it is customary in the industry, although a bore is different from an annulus. An annulus 362 is formed between the inner and outer pipes due to the separation introduced by the upstream lugs 360. The annulus 362 allows the fluid from the well to pass from one single joint pipe element to another and it is called herein annulus B. Note that a lug 360 does not extend all the way around the outside circumference of the inner pipe 330, and thus, the fluid can circulate through the annulus B. The annulus A is in fact the fluid path of the inner tubing string 212 and the annulus B is the fluid path of the outer tubing string 214.

Lug 360 is in contact with the outer pipe 340 and may be attached to it also by welding. However, in another embodiment, the lugs 360 are welded to the inner pipe 330 and then this assembly is pressed inside the outer pipe 340, with no welding. The lugs 360 may engage with a corresponding groove 350 formed in one of the pipes. A shoulder 351 of the groove 350 is configured to stop the lug 360 from further advancing into the outer pipe. In one embodiment, the size of the lugs is selected to be a little larger than the size of the annulus B, and thus, by pressing the lugs between the two pipes makes the connection of the inner and outer pipes to be fixed, i.e., a torque applied to the outer pipes is transmitted to the inner pipe and thus, the inner pipe cannot rotate relative to the outer pipe or vice versa. In other words, the inner and outer pipes act as a single unit under rotation. Other methods for attaching the lugs to the inner and outer pipes may be used. It is noted that the inner pipe cannot rotate relative to the outer pipe for any of the joint pipe elements discussed herein because of these lugs or other mechanisms. In this way, the torque applied to the outer pipe of a joint pipe element is conveyed though the lugs to the inner pipe, thus insuring that all threads in a given joint pipe element are sufficiently tightened when forming a tubing system as in FIG. 2. This result is achieved irrespective of the manufacturing method selected for forming the joint pipe element, i.e., the lugs are welded, or just pressed, or forged, etc.

Still with regard to FIG. 3, in one application, the grooves 350 are formed in the interior surface 352 of the outer pipe 340 so that, when the inner pipe 330 and the upstream lugs 360 are placed inside the outer pipe 340, a corresponding lug 360 stops its movement along the X axis when contacting the corresponding shoulder 351. The number of grooves coincides with the number of lugs. The groove 350 is positioned so that an alignment of the inner pipe relative to the outer pipe along the longitudinal axis X is achieved. For example, in the embodiment of FIG. 3, the top most part of the inner pipe 330 is offset from the top most part of the outer pipe 340 by a distance 01. In one application, the distance 01 is between a couple of millimeters to a couple of centimeters. In still another application, the distance 01 may be zero, i.e., the top most part of the outer pipe may be flush with the top most part of the inner pipe.

Still with regard to FIG. 3, the inner pipe 330 is made to have an upstream end 330A and a downstream end 330B that are both treaded. The upstream end 330A is shaped as a tubular box 332 that has internal (female) threads 334. The tubular box 332 may be made, in one application, by upset forging. Other methods may be used to form this part. The downstream end 330B is shaped as a tubular pin 336 having an external (male) thread 338. The inner pipe 330 has a bore 339 (that forms the annulus A of the inner tubular string) through which a valve may be lowered into the well or oil may be brought to the surface. As previously discussed, the bore 339 of the inner pipe 330 is called annulus A, the annulus between the inner pipe 330 and the outer pipe 340 is called annulus B, and the annulus between the outer pipe 340 and the casing (not shown) is called the annulus C.

Figure 4:
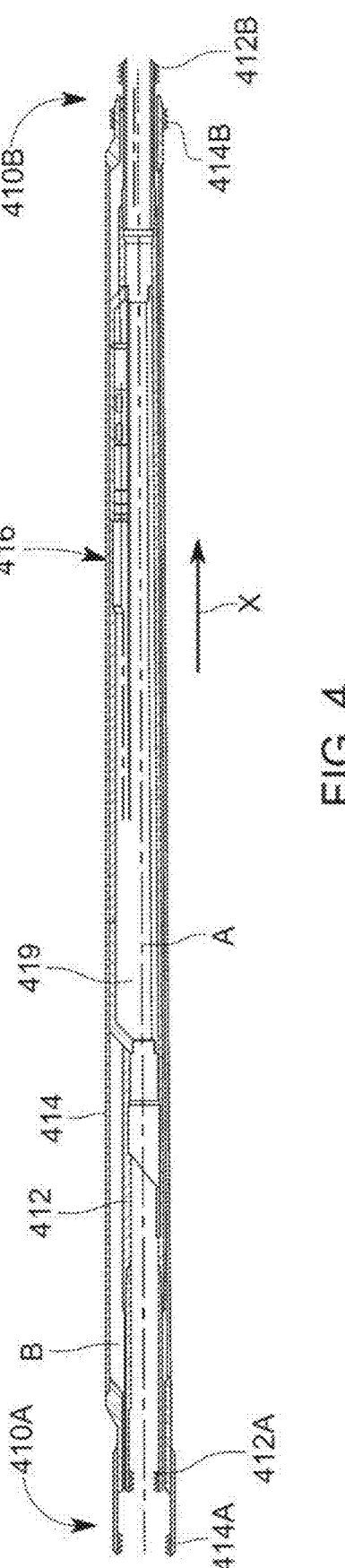
FIG. 4 illustrates a mandrel that is compatible with a joint pipe element that has concentric dual pipes.

For fixing the inner pipe 330 relative to the outer pipe 340, in addition to the upstream lugs 360 discussed above, downstream lugs 370 may be used at the downstream end of the outer and inner pipes. Two or more downstream lugs 370 may be used. Although FIG. 3 shows the inner pipe 330 being concentric relative to the outer pipe 340, it is possible that only one or both ends of the two pipes to be concentric, while the body (the part between the ends) is not concentric, and this element is called a mandrel or joint pipe mandrel and this element is illustrated in FIG. 4. One or both ends of the two pipes for the joint pipe element or the mandrel are concentric so that the joint pipe element can be attached to another joint pipe element or a connector by a single rotational motion or the mandrel can be attached to a joint pipe element or a connector by a single rotational motion. Note that the terms "downstream" and "upstream" in this application refer to a direction toward the toe of the well and a direction toward the head of the well, respectively.

FIG. 4 shows a joint pipe mandrel 410 having an outer member or conduit (pipe) 414 that houses an inner member or conduit (pipe) 412. The inner member 412 defines the annulus A while the outside surface of the inner member 412 and the inner surface of the outer member 414 defines the annulus B. A pocket 416 is attached to the inner member 412 for housing a valve (not shown). The pocket 416 partially extends along a length of the inner member 412 and abuts to the inner surface of the outer member 414. The pocket 416 is fluidly insulated from the outer member 414 except for one or more ports discussed later. The pocket 416 is also fluidly insulated from the inner member 412, except for a slot 419, which is configured to receive a valve deployed through the annulus A. In this way, a flow of a fluid in annulus A is insulated from a flow of another fluid in annulus B and a cross-over from one annulus to another can be controlled with the valve.

The joint pipe mandrel 410 has an upstream end 410A that has threads 412A formed on the inner part of the inner member 412 and threads 414A formed on the inner part of the outer member 414. The joint pipe mandrel 410 also has a downstream end 410B that has threads 412B formed on the outer part of the inner member 412 and threads 414B formed on the outer part of the outer member 414. The threads on the upstream end of the inner and outer members have the same pitch so that they engage corresponding threads of a joint pipe element or connector simultaneously, with a single rotation motion. The same is true for the threads on the downstream end. In one embodiment, the threads of the upstream end have the same size and configuration as the threads of the downstream end. Those skilled in the art would understand that the threads on either end may be formed on either inner or outer part of the inner and outer members and it is a matter of convenience or choice which part of the inner and outer members holds the threads. In other words, consistent with the terminology of the joint pipe element 300 discussed in the previous embodiments, the upstream ends of the inner and outer members may be shaped as a tubular box or a tubular pin.

Figure 5:
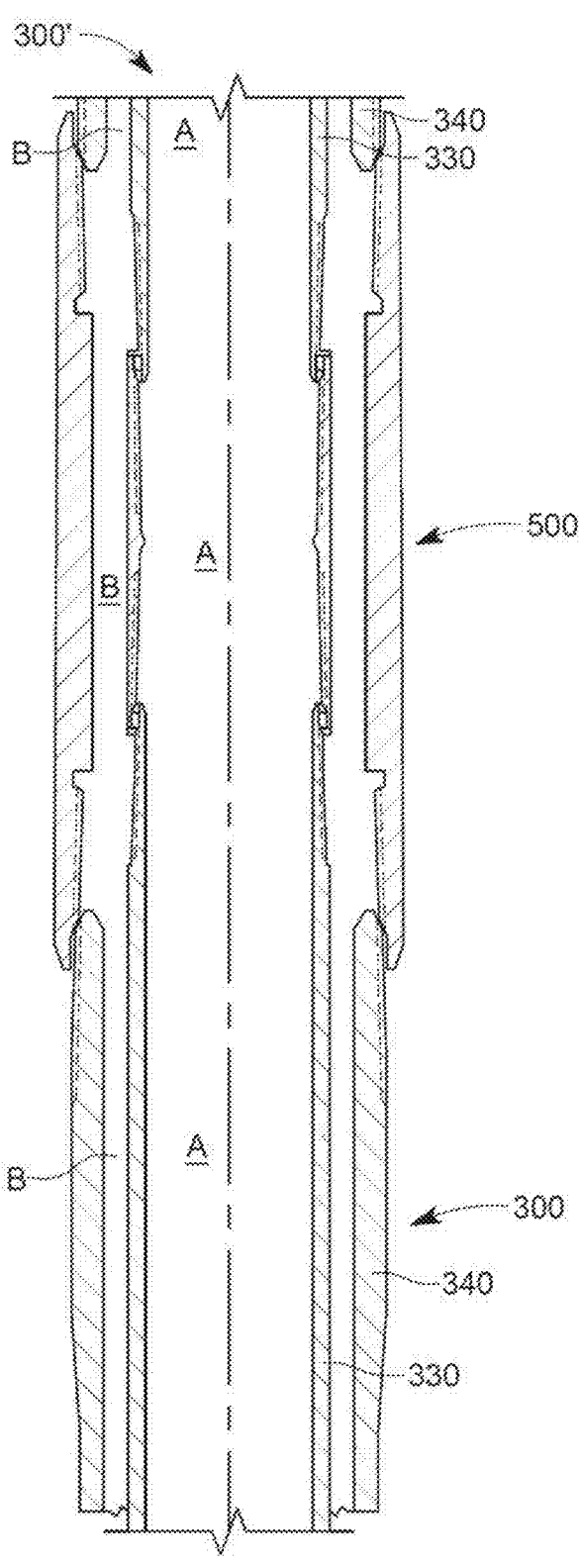
FIG. 5 illustrates two joint pipe elements that are connected to each other by a connector.
Figure 6:
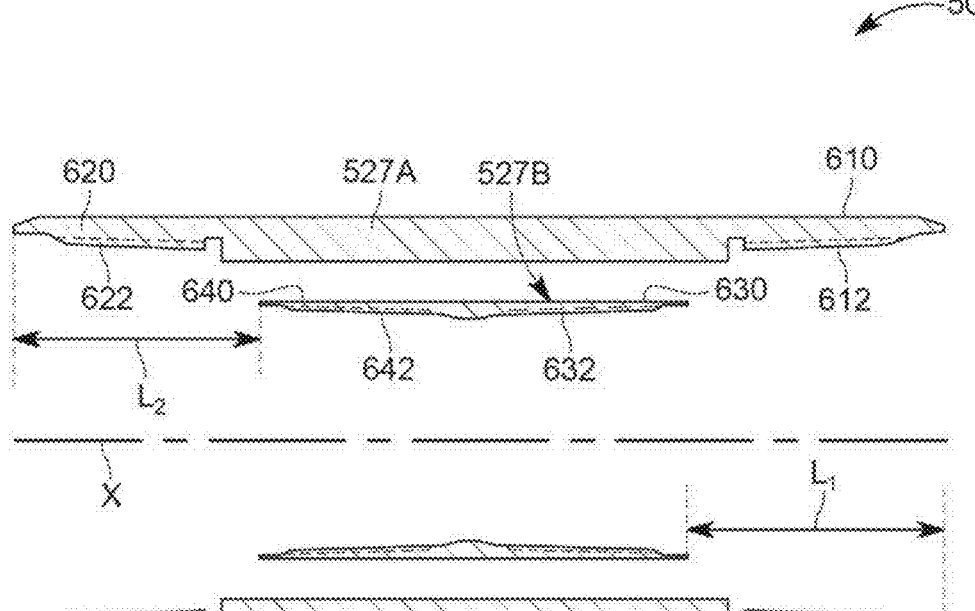
FIGS. 6 and 7 illustrate the connector.
Figure 7:
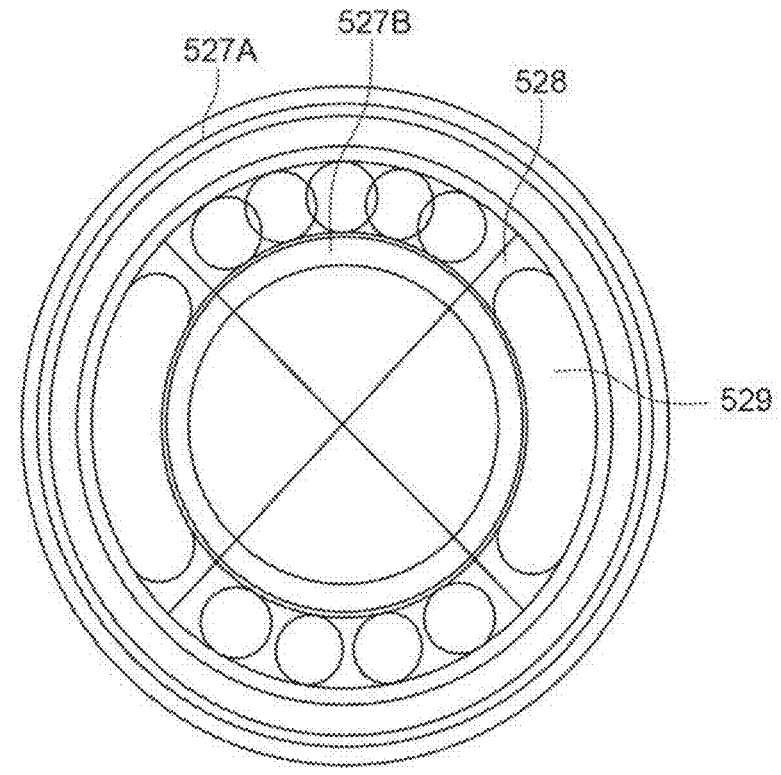

A dual housing connector 500 is shown in FIG. 5 and is configured to connect both the inner pipes and the outer pipes of the joint pipe elements 300 and 300' to each other, to form the annulus A and the annulus B. FIG. 6 shows a cross-section through the dual housing connector 500. The dual housing connector 500 has an outer body 527A that connects the outer pipes of the joint pipe elements and an inner body 527B that connects the inner pipes of the joint pipe elements. The inner body 527B is attached to the outer body 527A, as shown in FIG. 7, by one or more webs (or bridges) 528. In one application, the outer body, the inner body and the one or more webs are integrally formed from a single solid part. Holes or slots 529 or both are formed between the two bodies and the webs for allowing the fluid in annulus B to move from one joint pipe element to another one. In one application, the slot has an oval form. Other shapes may be used for the slot 529. In one embodiment, the two bodies 527A and 527B are made of a same piece of material, i.e., they are an integral body.

Returning to FIG. 6, one end of the outer body 527A is shaped as an upstream tubular box 610 that has inner threads 612 and the other end is shaped as a downstream tubular box 620 that has inner threads 622. The inner threads 612 and 622 are configured to engage the corresponding threads of the outer pipes of the joint pipe elements or a joint pipe element and one of a tool or production tubing. In one application, the threads of the inner pipes of the joint pipe elements simultaneously engage the corresponding threads of the dual housing connector. The threads of the inner and outer bodies may be configured to have the same length. However, in one application, the threads of the outer body may be longer that the threads of the inner body.

The inner body 527B of the dual housing connector is shaped at one end as a tubular box 630 that has inner threads 632 and is shaped at another end as a tubular box 640 that has inner threads 642. The inner threads 632 and 642 are configured to engage the corresponding threads of the inner pipes of the joint pipe elements. In this embodiment, the inner tubular boxes 630 and 640 are offset inside the housing relative to their outer counterparts 610 and 620, along the longitudinal X axis. More specifically, in this embodiment, the inner tubular boxes 630 and 640 are recessed from the outer tubular boxes 610 and 620, respectively, by distances L1 and L2, as illustrated in FIG. 6. Distances L1 and L2 may be the same or different or even zero.

The embodiments discussed above describe a joint pipe element that can be connected either directly to another joint pipe element or indirectly, through a connector, to another joint pipe element, to form a dual, concentric, tubing system. The inner and outer pipes of such joint pipe elements may be made of a same material (e.g., a metal, a composite, etc.) or from different materials. The number of teeth of the threads of the inner and outer pipes and the connector are identical so that when one joint pipe element is rotated to connect to another joint pipe element or to the connector, both the inner and outer pipes are simultaneously engaging with the corresponding inner and outer pipes of the other element or connector. The inner and outer pipes of the above discussed joint pipe elements were shown to be concentric and they can be installed in vertical or horizontal wells. They can be installed with a packer or with no packer.

Figure 8:
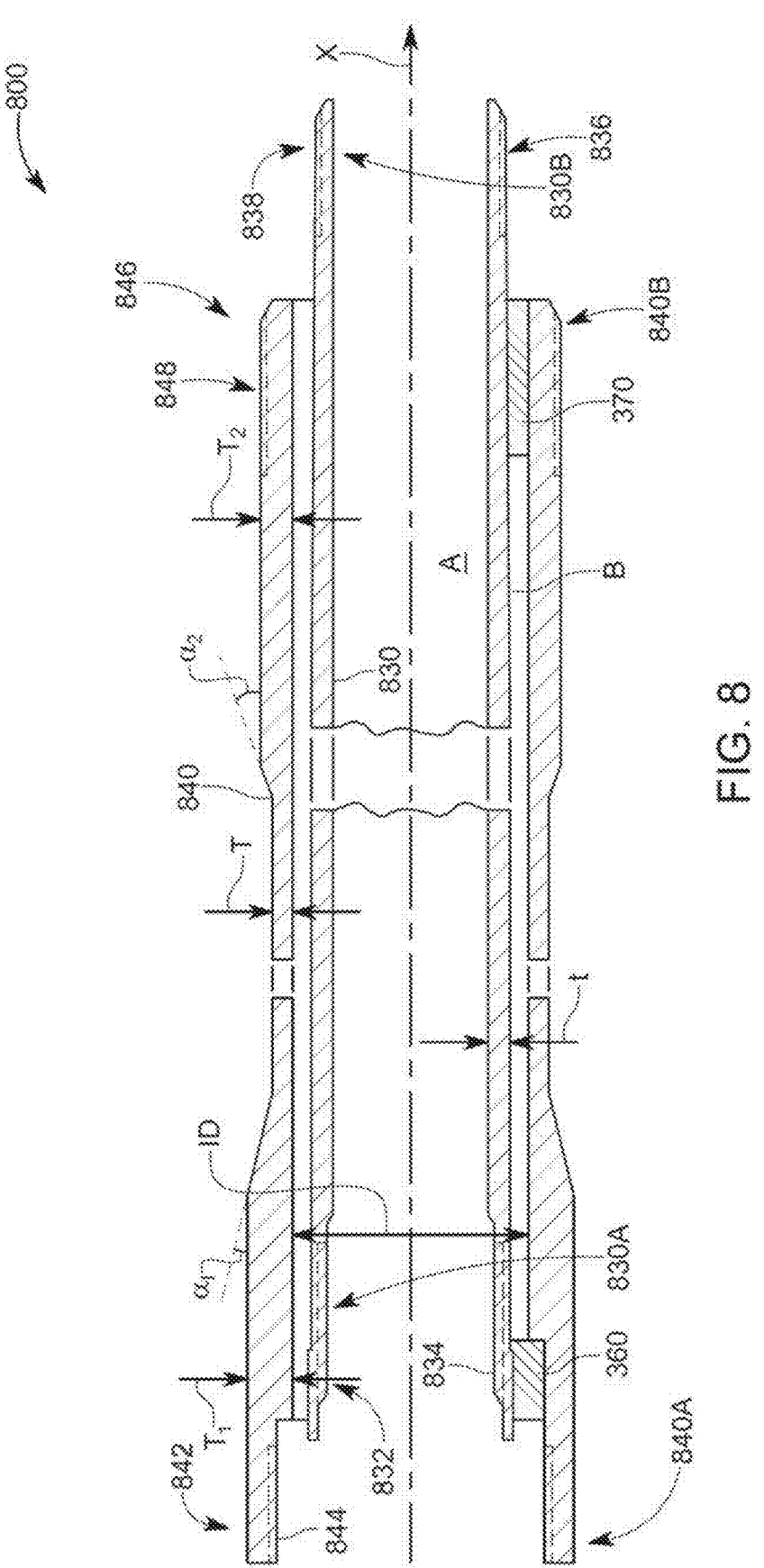
FIG. 8 illustrates a joint pipe element that has at least one end of an outer pipe upset forged.

FIG. 3 shows generically how the inner pipe 330 and the outer pipe 340 are shaped and also how the threads at the upstream and downstream ends are generically placed. FIG. 8 shows a practical implementation of a joint pipe element, that has the same elements as the joint pipe element 300 of FIG. 3, but this figure shows in more detail the shape of the upstream and downstream ends of each pipe. For simplicity, the lugs, grooves and other features are omitted in FIG. 8.

The joint pipe element 800 shown in FIG. 8 has an inner pipe 830 and an outer pipe 840, which is formed concentrically to the inner pipe 830. The upstream end 840A of the outer pipe 840 is upset forged to have a first thickness T1 and the downstream end 840B is also upset forged to have a second thickness T2. A thickness T of the outer pipe 840, between the two ends 840A and 840B, is smaller than each of the first thickness T1 and the second thickness T2. While in this embodiment T1 is larger than T2, it is also possible that T1 is equal to T2 or T1 is smaller than T2.

The upset forging process involves heating the end of the outer pipe at a high temperature so that the material from which the outer pipe is made becomes malleable. In this state, a force is applied to the malleable material to compress it so that this end of the pipe has a larger thickness than the rest of the pipe. The thickness T1 of this end is associated with a first deviation angle a1, and the thickness T2 of the other end is associated with a second deviation angle a2. The deviation angle is a measure that indicates how the external surface of a pipe changes along a longitudinal axis X. Note that the inner diameter ID of the outer pipe 840 is maintained in this embodiment constant throughout the length of the pipe and the ID is the same at each of the upstream end, the downstream end, and at any location between these two ends, as also shown in the figure. However, for this embodiment, the inner pipe 830 is not upset forged, i.e., a thickness of the inner pipe is the same along its length.

The threads 844 and 848 are made in the upset portions of the outer pipe 840 so that the thickness T of the material making up the outer pipe is preserved along the entire length of the pipe. In other words, although the threads formed at the ends of the outer pipe practically reduce the thickness of the material making the outer pipe, because of the upset forging process applied to the regions where the threads are made, the thickness of the material for the entire outer pipe stays to be at least T. In this way, a strength of the outer pipe is not negatively affected by the making of the threads. This is advantageous because the outer pipes of the joint pipe elements may be designed to support the entire weight of the tubing system, and for this reason, it is not desired to have any weak point in the joint pipe elements.

However, the inner pipe 830 is not upset forged in this embodiment, meaning that its thickness t is constant throughout the length of the pipe. When the threads 834 and 838 are made at the upstream end 830A and the downstream end 830B of the inner pipe, respectively, then the thickness for those portions becomes less than t. In one application, the thickness t of the inner pipe is equal to the thickness T of the outer pipe. However, in a different application, the thickness t could be smaller or larger than the thickness T.

Figure 9:
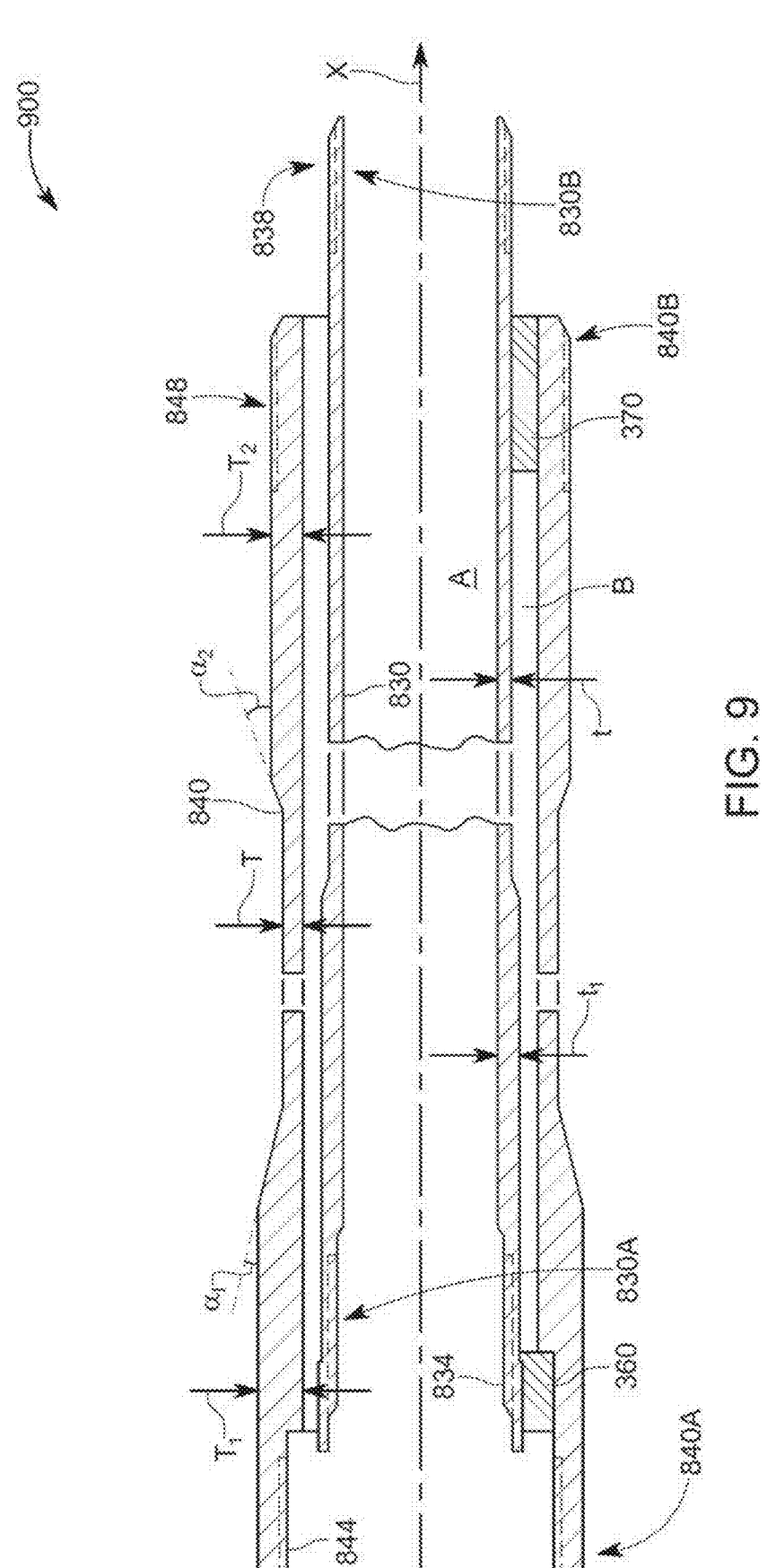
FIG. 9 illustrates a joint pipe element that has at least one end of an outer pipe and an inner pipe upset forged.

In another embodiment, as shown in FIG. 9, not only the upstream end and the downstream end of the outer pipe 840 are upset forged, but also the upstream end 830A of the inner pipe 830. In this regard, note that a thickness t1 of the upstream end 830A is larger than a thickness t of the remainder of the inner pipe 830. However, the downstream end 830B of the inner pipe 830 is not upset forged in this embodiment.

Figure 10:
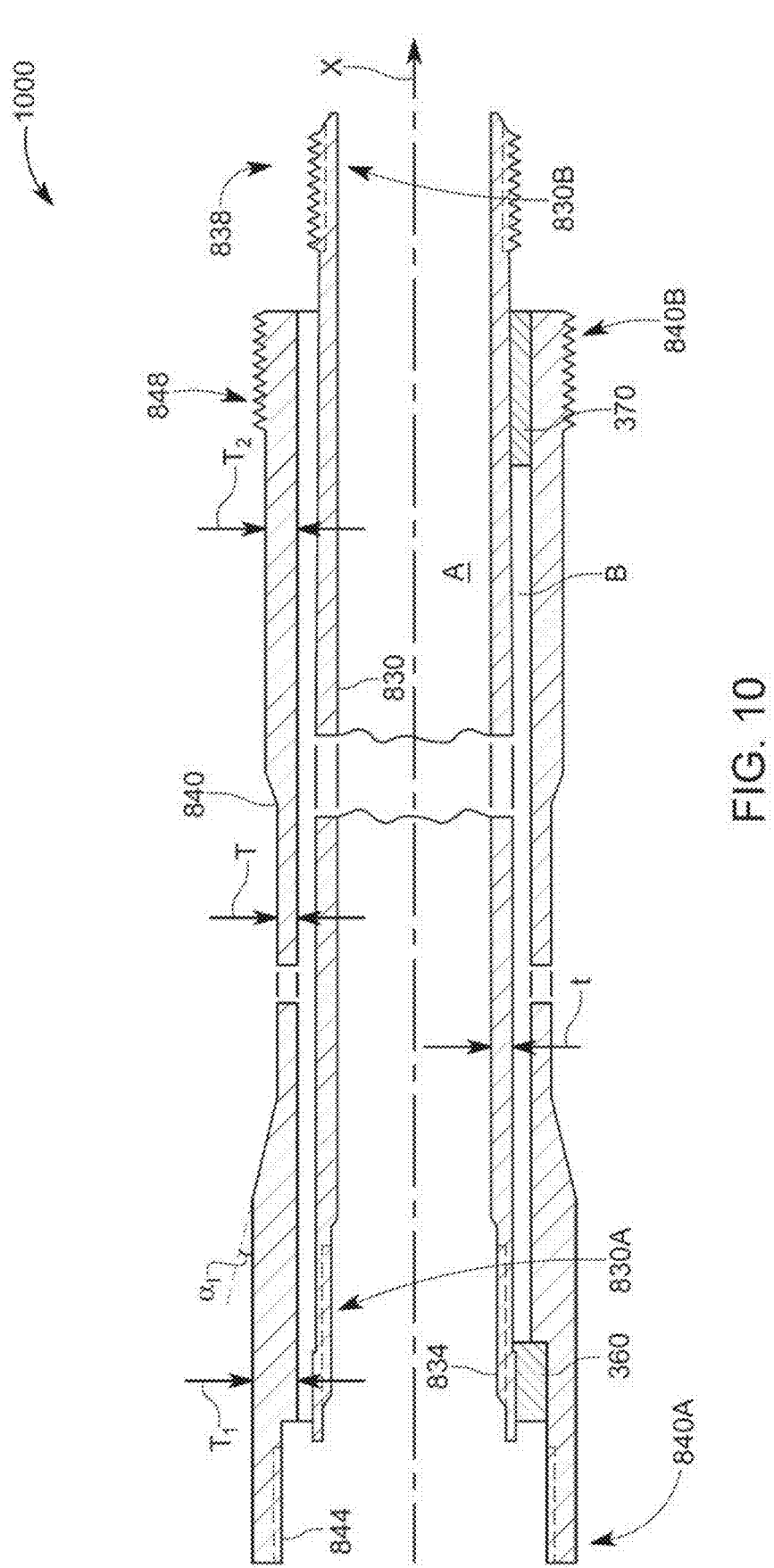
FIG. 10 illustrates a joint pipe element that has only one end of an outer pipe upset forged.

In yet another embodiment, as illustrated in FIG. 10, only the upstream end 840A of the outer pipe 840 is upset forged while the other end of the outer pipe and both ends of the inner pipe are not upset forged. This means that for the joint pipe element 1000, a thickness t of the inner pipe is the same along its entire length and the thickness T2 of the outer pipe is equal to the thickness T, while the thickness T1 is larger than T.

Figure 11:
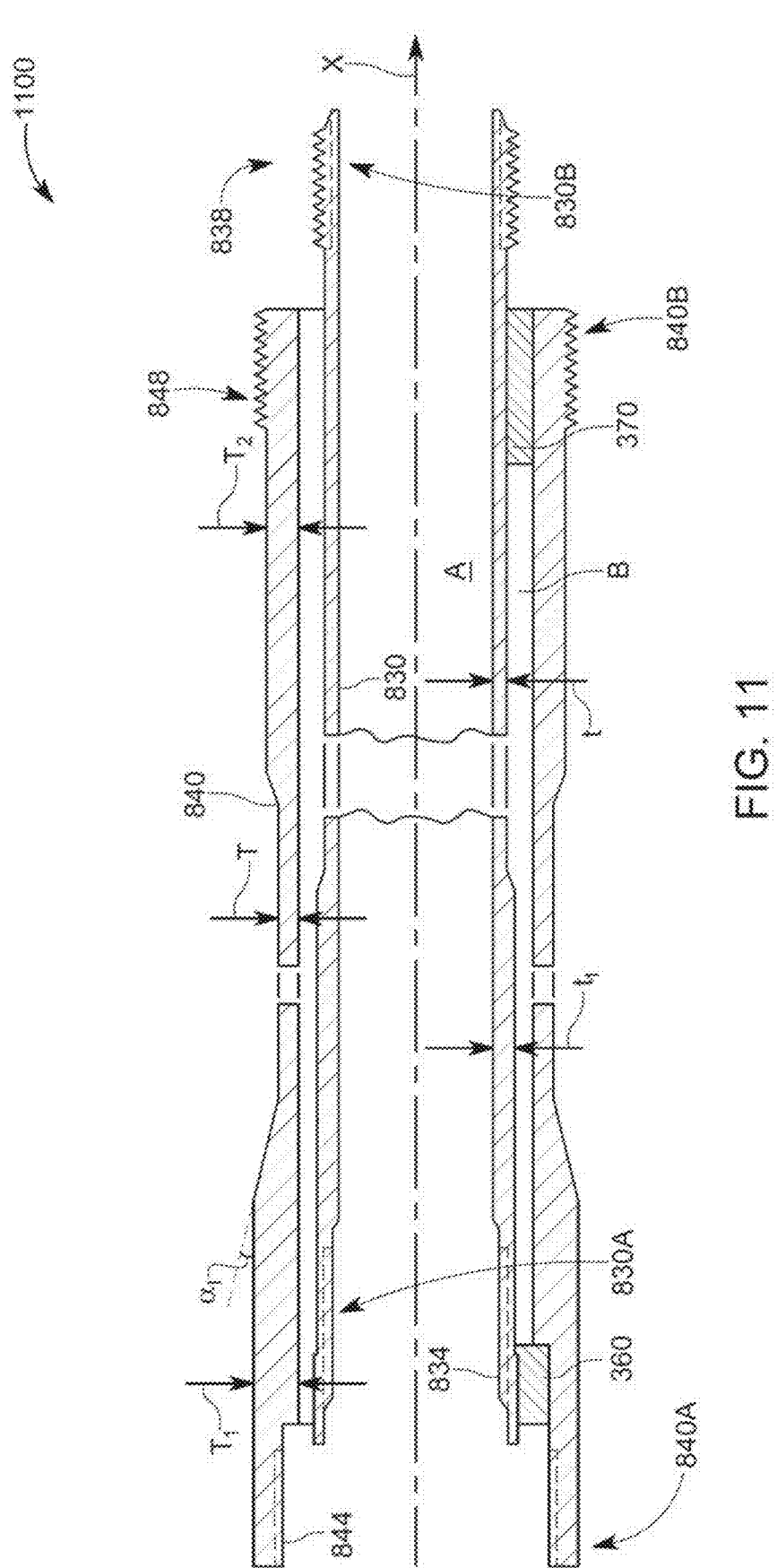
FIG. 11 illustrates a joint pipe element that has only one end of an outer pipe and an inner pipe upset forged.

FIG. 11 shows another possible implementation of the joint pipe element 1100. In this implementation, the upstream end 840A of the outer pipe 840 is upset forged while the downstream end 840B is not, i.e., T1 is larger than T and T is equal to T2. For the inner pipe 830, the upstream end 830A is upset forged while the downstream end 830B is not, i.e., t1 is larger than t.

The embodiments illustrated in FIGS. 8-11 show the upstream end 840A of the outer pipe being shaped as a tubular box 842, the downstream end 840B of the outer pipe being shaped as a tubular pin 846, the upstream end 830A of the inner pipe 830 being shaped as a tubular box 832, and the downstream end 830B of the inner pipe being shaped as a tubular pin 836. The term "tubular box" is defined as a structure that forms a chamber in which it receives a threaded device and the chamber is tubular. The term "tubular pin" is defined as a structure that enters inside a chamber and its shape is tubular. Both the tubular box and the tubular pins have threads that match each other so that a tubular pin mates with a tubular box.

While the embodiments of FIGS. 8-11 show a tubular box at one end and a tubular pin at another end of each of the inner and outer pipes, it is also possible to have tubular pins at each end of the inner and outer pipes, in which case a connector (like connector 500) needs to be used to attach such joint pipe elements to each other. Those skilled in the art would understand, based on this disclosure, that a joint pipe element may have the ends of the inner and outer pipes shaped as either a tubular pin or a tubular box, and these shapes may be mixed in any desired way for the four ends of a joint pipe element and/or a connector.

Figure 12:
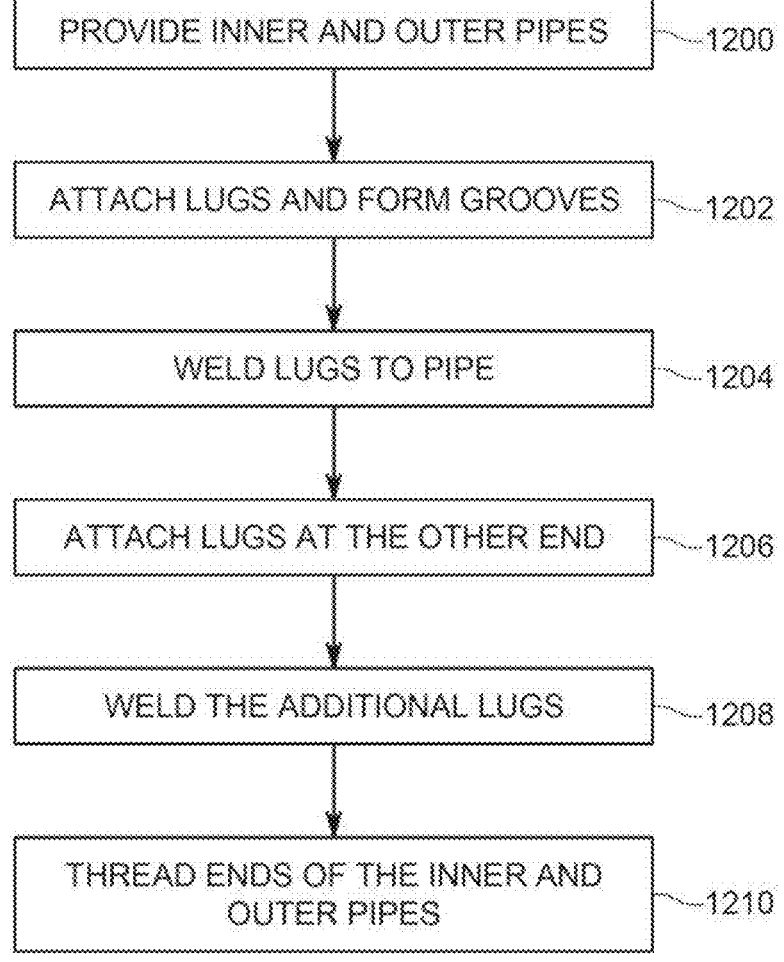
FIG. 12 is a flowchart of a method for manufacturing a joint pipe element.
Figure 13A:
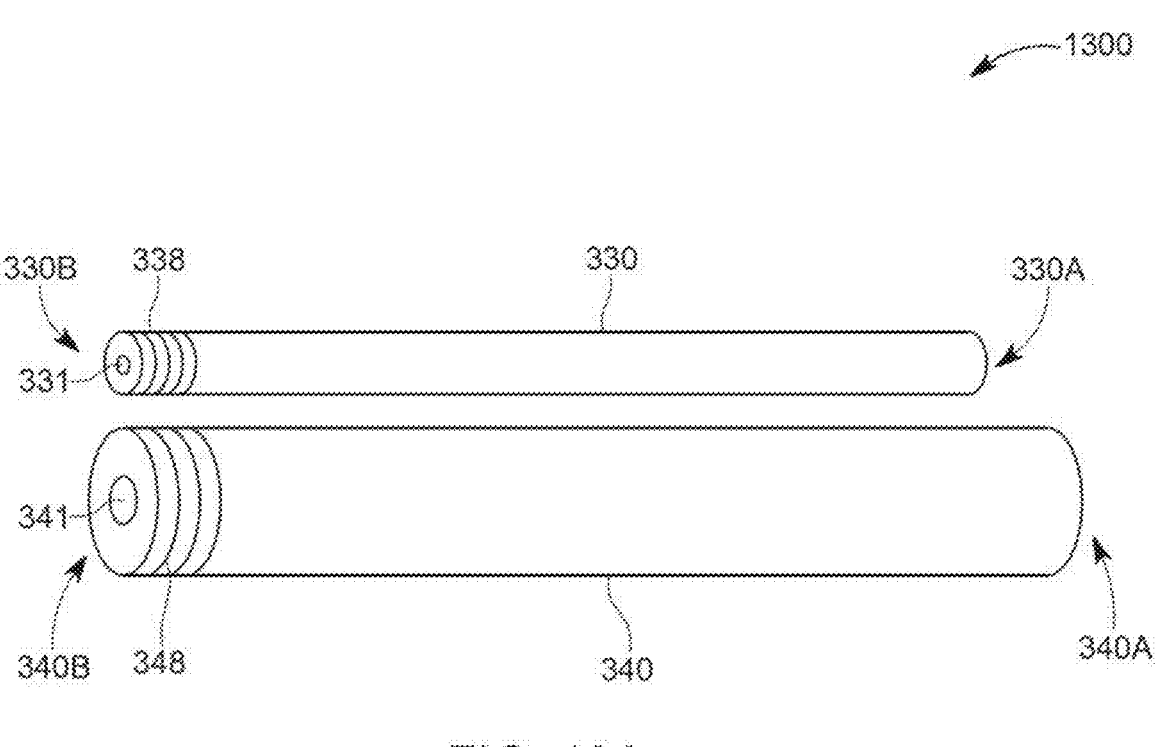
FIGS. 13A to 13F illustrate the various phases of manufacturing the joint pipe element.

A method for forming a joint pipe element is now discussed with regard to FIG. 12. The method starts in step 1200, when an inner pipe 330 and an outer pipe 340 are provided, as shown in FIG. 13A. An end (e.g., 330B and 340B) of each of these two pipes may be already threaded or if not, they are threaded now. The two ends are threaded at the same time in a synchronized manner so that they have the same shape. Note that the length of the thread 348 of the outer pipe 340 may be longer than the thread 338 of the inner pipe 330. At least one end of the outer pipe was previously upset forged and the corresponding threads were formed in this upset forged part as discussed above with regard to FIG. 8. Additional ends may be also upset forged. The inner pipe 330 has a bore 331 and the outer pipe 340 has a bore 341.

Figure 13B:
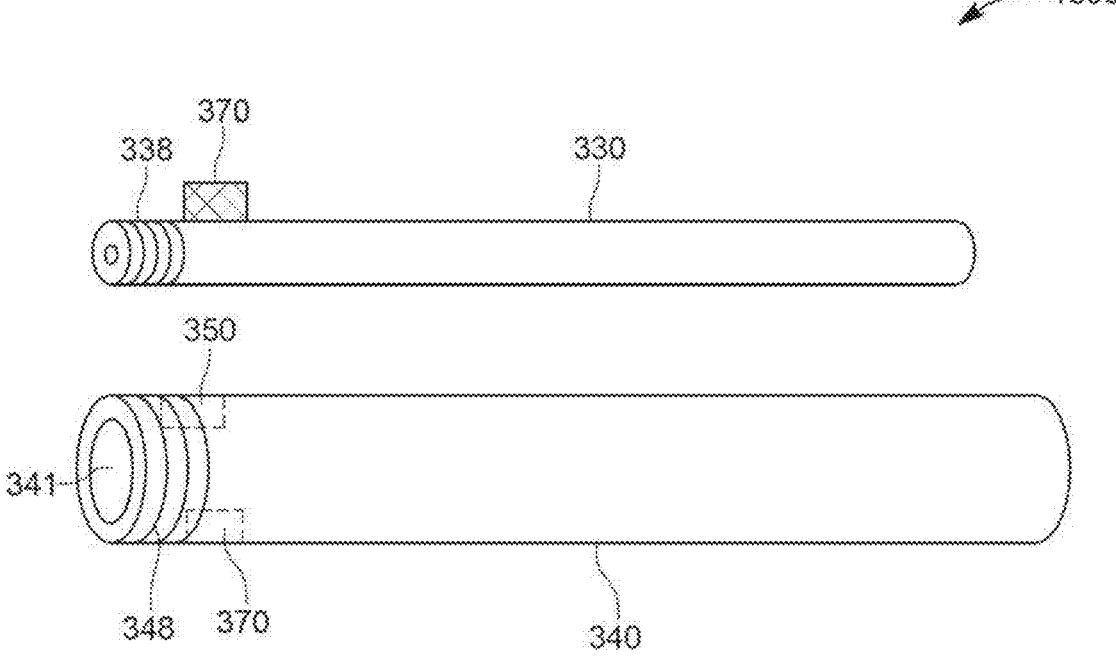
Figure 13C:
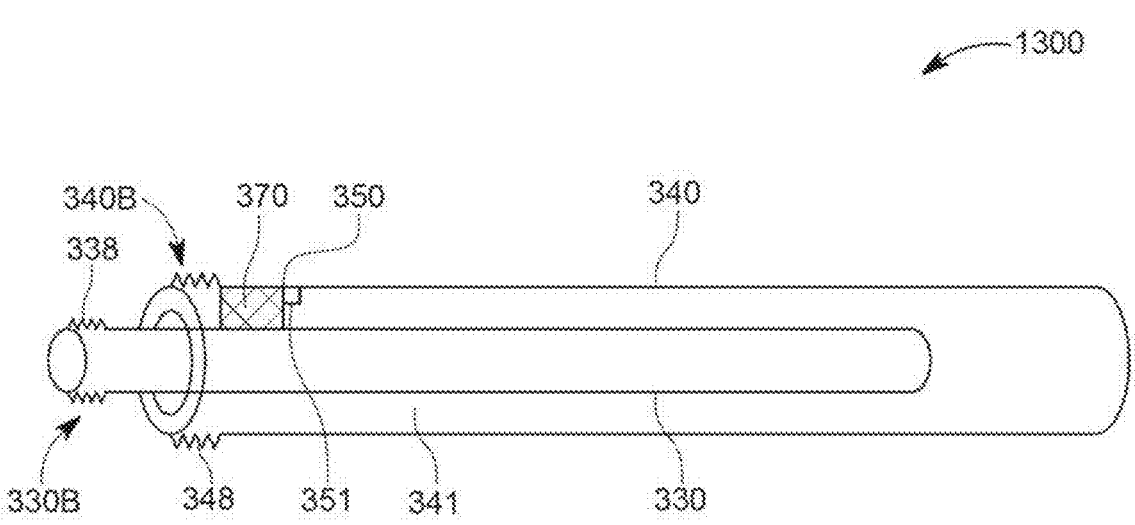
Figure 13D:
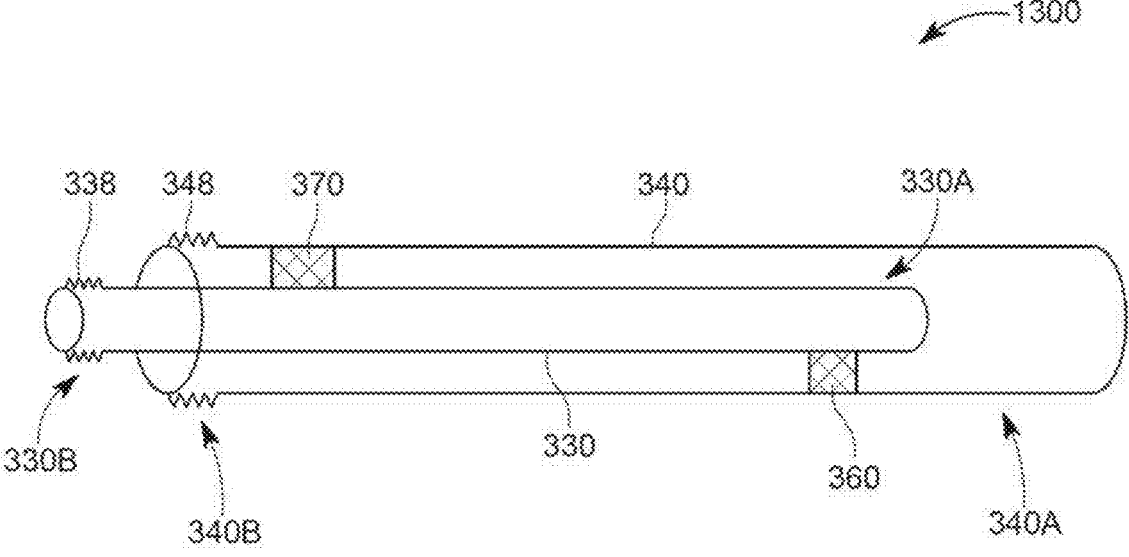

In step 1202, one or more lugs 370 are attached (e.g., welded) to an outer surface of the inner pipe 330 as illustrated in FIG. 13B. Alternatively, the lugs 370 may be welded inside the outer pipe 340 as illustrated by the dash line. A corresponding groove 350 is formed in the bore of the outer pipe 340 for accommodating the lug 370. Then, in step 1204 the inner pipe 330 is placed in the bore 341 of the outer pipe 340, as illustrated in FIG. 13C. The lug 370 slides into the corresponding groove 350 until the lug reaches the shoulder 351. The positioning of the groove and lug on the outer and inner pipes, respectively, are calculated so that the inner pipe becomes concentric with the outer pipe and also the downstream end 330B of the inner pipe is correctly offset relative to the downstream end 340B of the outer pipe 340. Also in step 1204, the lugs are welded to the corresponding pipe, i.e., if the lugs are attached to the inner pipe in step 1202, the lugs are now welded to the outer pipe and vice versa. Those skilled in the art would understand from these teachings that other mechanisms may be used to attach the inner pipe to the outer pipe, for example, a male/female type of attachment or any other mechanism that has one member on the inner pipe and another member on the outer pipe and the two members mate in such a way that the attachment mechanism transfers rotational torque and/or share tensile and compression loads between the two pipes.

Figure 13E:
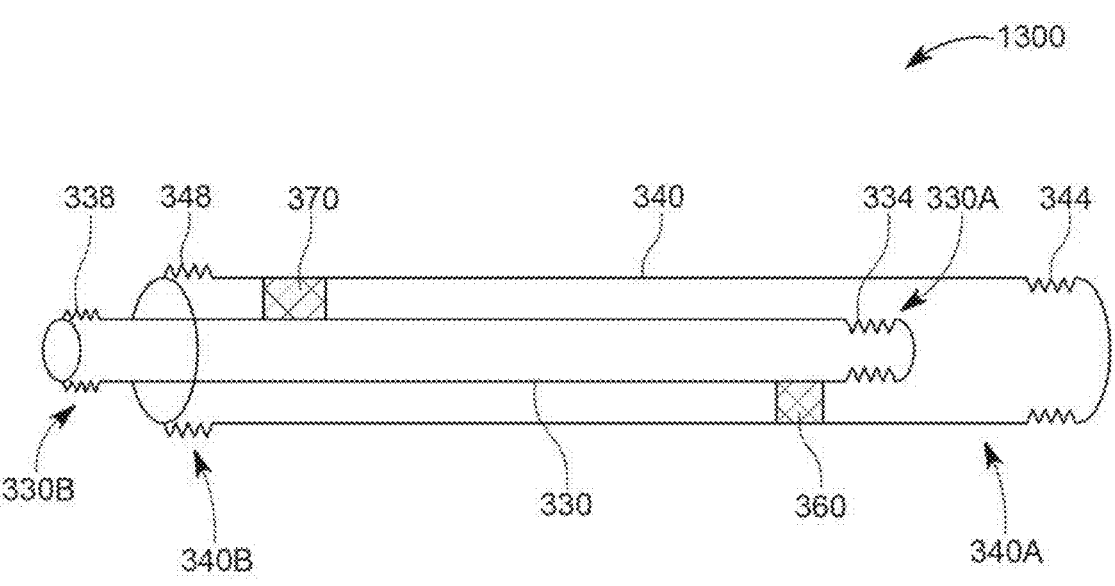
Figure 13F:
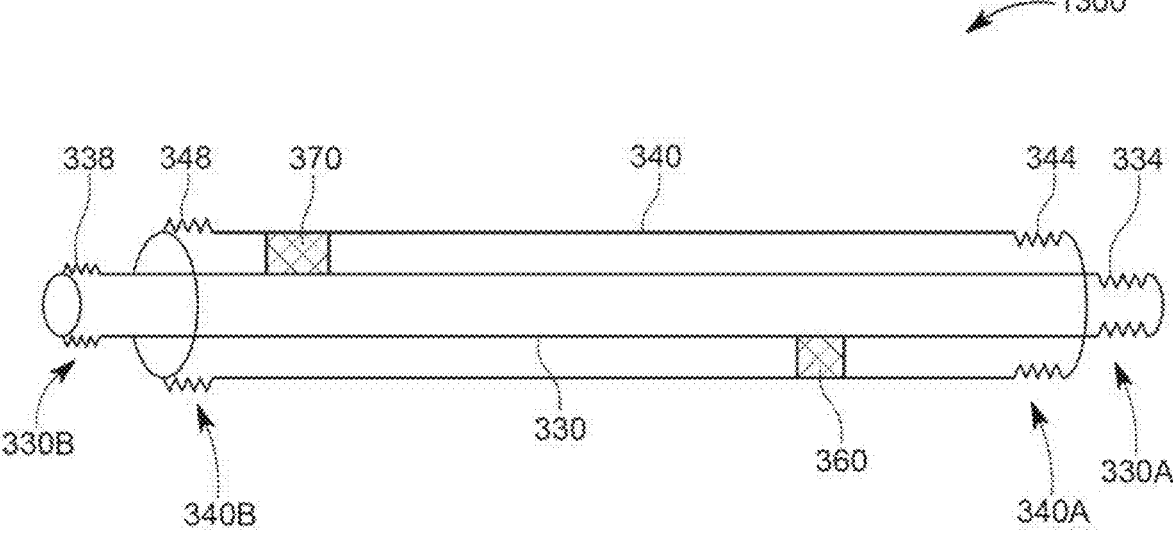

In step 1206, additional lugs 360 are inserted between the inner and outer pipes, at the upstream ends 330A and 340A, and in step 1208 these lugs are welded to the pipes as shown in FIG. 130. At this time, the inner and outer pipes are concentric to each other. In step 1210, the upstream ends 330A and 340A are treaded in such a way that the threads 334 and 344 are synchronized. Also, a length of the outer pipe 340 may be trimmed, if necessary, just before threading it. The threads 334 and 344, which are shown in FIG. 13E, are formed in the bore of each of the inner and outer pipes, respectively. One skilled in the art would understand that variations of the joint pipe element 1300 shown in FIGS. 13A to 13E may be implemented using the same method. For example, one such variation is shown in FIG. 13F, where both ends of the inner pipe extend past the ends of the outer pipe and all the threads are formed on the outside surface of the inner and outer pipes. Other variations may be implemented, for example, where two, three or all four ends are upset forged, and/or any number of the threads are formed on the outer surface of the inner and outer pipes.

Figure 14:
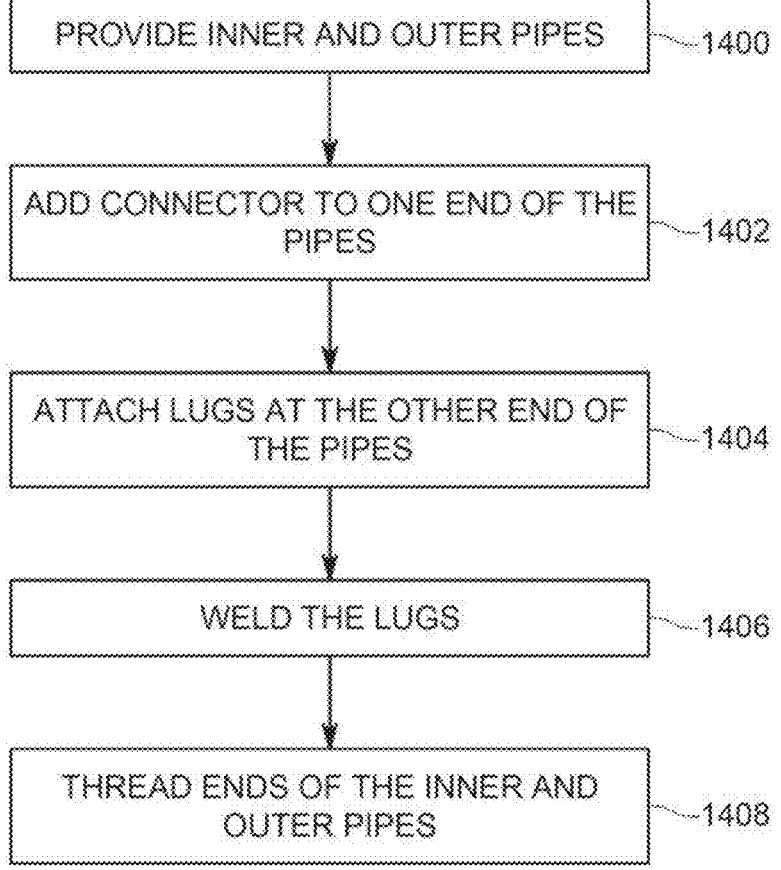
FIG. 14 is a flowchart of another method for manufacturing a joint pipe element.
Figure 15A:
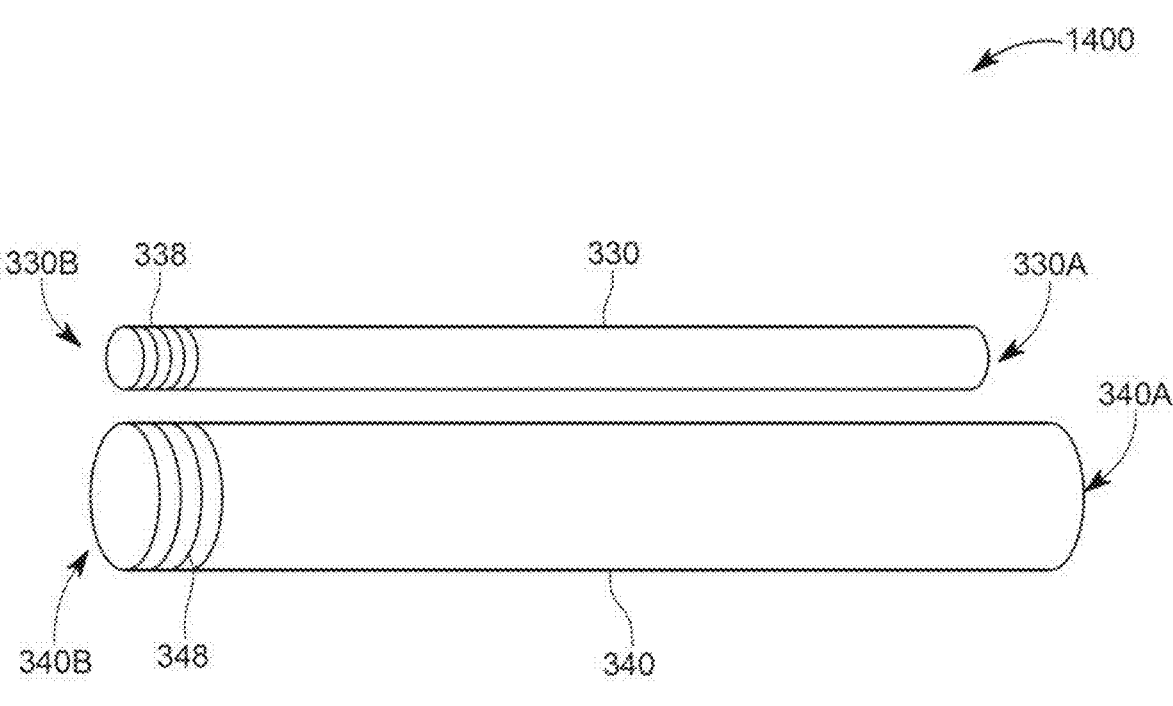
FIGS. 15A to 15C illustrate the various phases of manufacturing the joint pipe element.

Another method for forming a joint pipe element is now discussed with regard to FIG. 14. The method of FIG. 14 uses fewer lugs and fewer welding operations for joining the inner and outer pipes. The method starts with step 1400, in which the inner and outer pipes are provided as illustrated in FIG. 15A. At least one end of the outer pipe has been upset forged. A corresponding thread 338 was already made at one end of the inner pipe 330 and a thread 348 was made at one end of the outer pipe 340. If this is not the case, the threads are formed in this step.

Figure 15B:
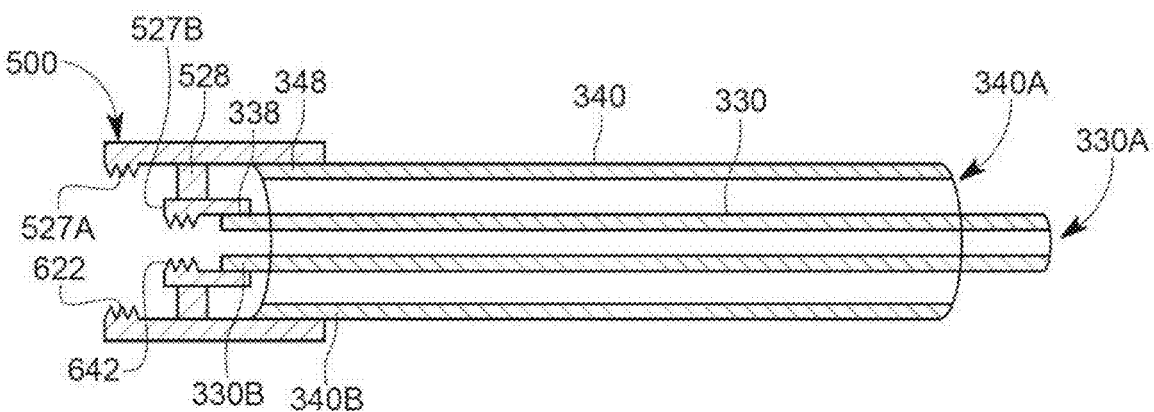

In step 1402, instead of adding lugs and making grooves at the ends that have the threads, the two threaded ends 330B and 340B are attached with their threads to corresponding threads of a connector 500 as shown in FIG. 15B. Note that this process is faster and more efficient as no lugs and no welding is necessary. Also, by attaching the two ends 330B and 340B to the connector 500, which already has the inner boy 527B and the outer body 527A concentric to each other, the ends 330B and 340B of the inner and outer pipes are aligned to become concentric to each other.

Figure 15C:
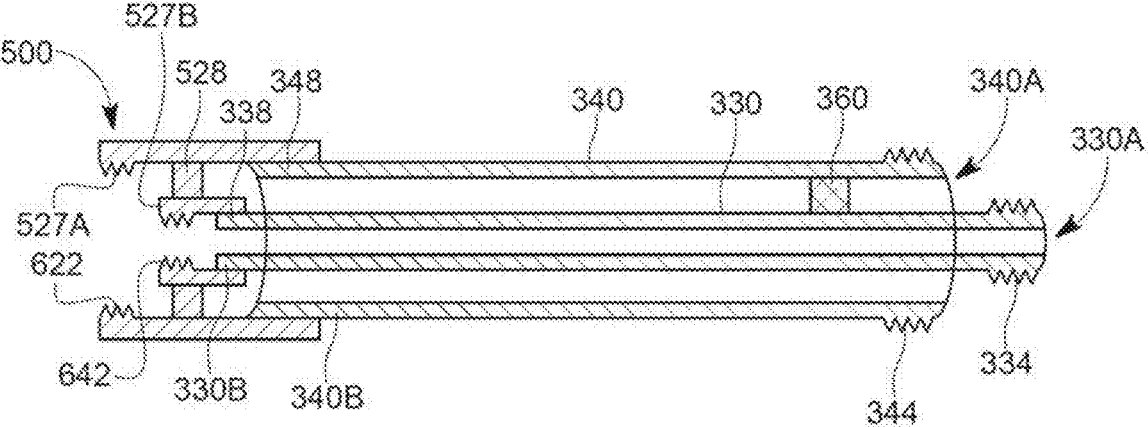
Figure 16:
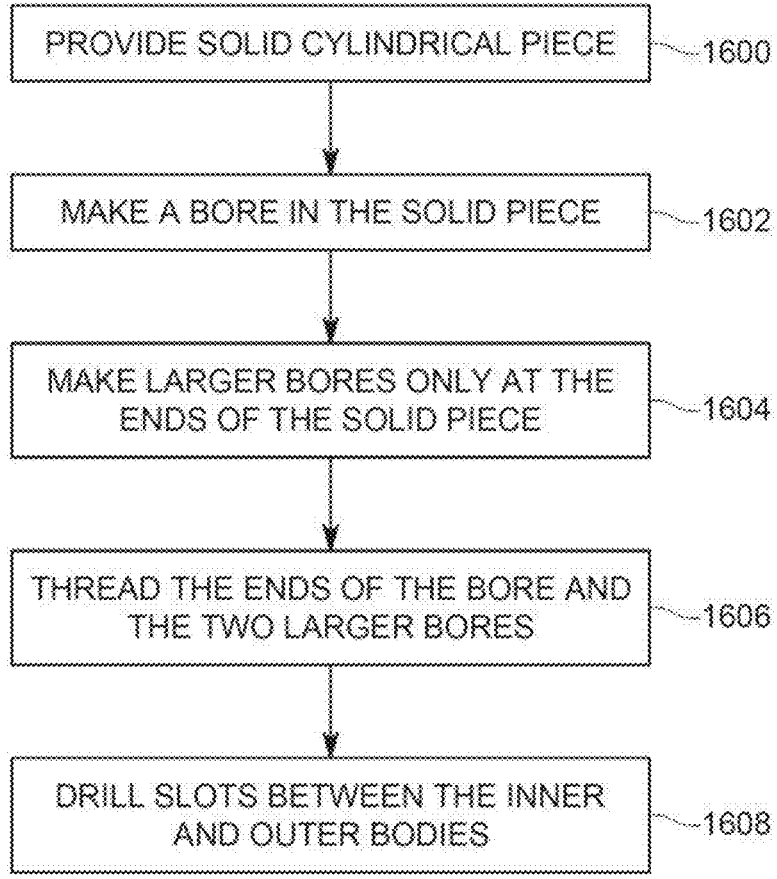
FIG. 16 is a flowchart of a method for manufacturing a connector for a joint pipe element.

Then, in step 1404, lugs 360 are attached to the other ends, i.e., ends 330A and 340A of the inner and outer pipes, respectively and then in step 1406 the lugs are welded to the pipes as shown in FIG. 15C. In this way, the other two ends 330A and 340A are becoming concentric to each other. With this configuration, the ends 330A and 340A of the inner and outer pipes are threaded in step 1408, in a synchronized way and the outer or inner pipe may be trimmed, if necessary, either after or before the threading step, which results in the joint pipe element 1400 shown in FIG. 15C. As for the previous method, more than one end may be upset forged and/or the threads may be formed on the interior of the inner and outer pipes or in any other combination.

While the above embodiments have been discussed with regard to forming a joint pipe element, the next embodiment discusses a manufacturing processes for the connector 500. As discussed above with regard to FIGS. 6 and 7, the connector 500 is a dual housing connector because it has an inner housing and an outer housing. However, it is possible to have a single housing connector and for this case, either the inner pipes or the outer pipes of two joint pipe elements connect directly to each other and the other pipes connect through the single housing connector. The manufacturing of the dual housing connector 500 starts in step 1600 (see FIG.

Figure 17A:
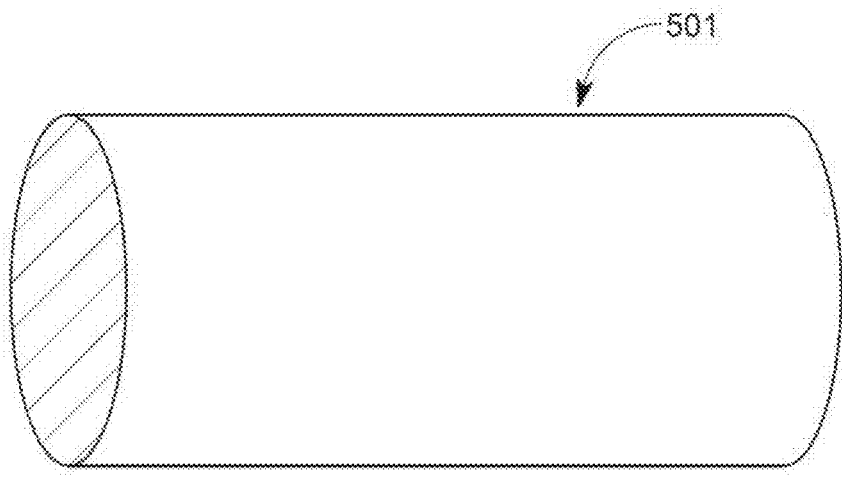
FIGS. 17A to 17F illustrate the various phases of manufacturing the connector.
Figure 17B:
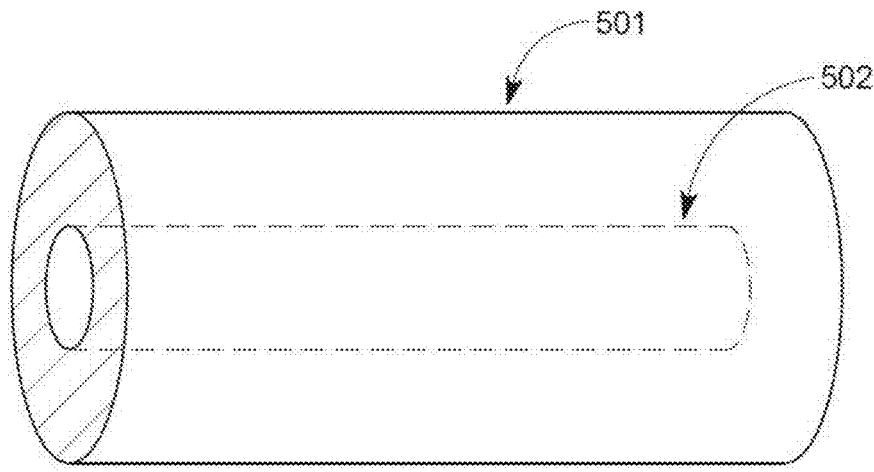
Figure 17C:
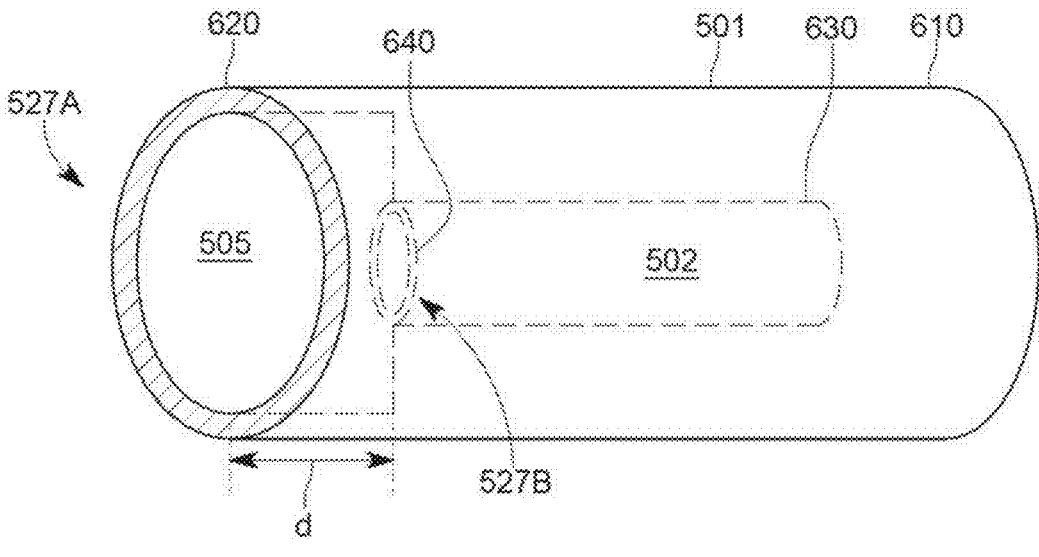
Figure 17D:
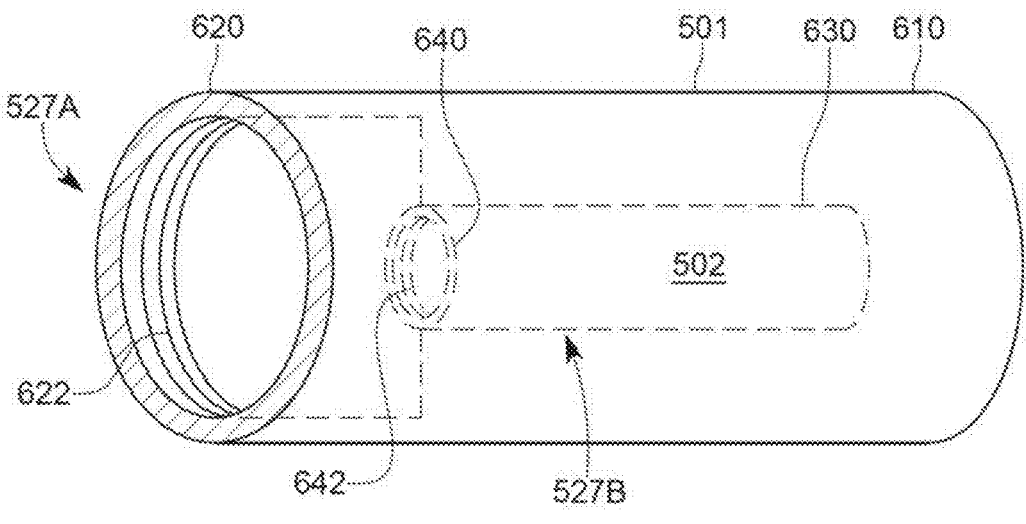

16 which is a flowchart of the manufacturing method of the dual housing connector) with providing a solid cylindrical piece 501 of a strong material (for example, steel, but other materials may be used), as shown in FIG. 17A. Then, in step 1602, a bore 502 is made into the solid piece 501, as illustrated in FIG. 17B. Bore 502 would correspond to annulus A of the inner body 527B. The bore extends through the entire length of the solid piece. In step 1604, a larger bore 505 is made into both ends of the solid piece 501, to define the tubular boxes 610 and 620. This larger bore does not extend through the entire length of the solid piece. The larger bore 505 is concentric to the bore 502. The larger bore extends for a depth d into the solid piece 501, as shown in FIG. 17C, which is shorter than half of a length of the solid piece 501. The larger bores 505 define the tubular boxes 610 and 620 and also the ends of the inner body 527B. Then, in step 1606, threads (only threads 622 and 642 of the tubular boxes 620 and 640, respectively, are shown for simplicity) are made to each of the tubular boxes 610, 620, 630, and 640 as shown in FIG. 170. In other words, threads are made to the ends of the bore 502, and also to the ends of the two larger bores 505. The threads 622 and 642 are synchronized so that corresponding threads of a joint pipe element can be simultaneously connected to these treads, by a single rotational motion. While the threads in this embodiment are made into the interior surfaces of the inner and outer bodies, the threads may also be formed to the exterior surface of the outer body.

Figure 17E:
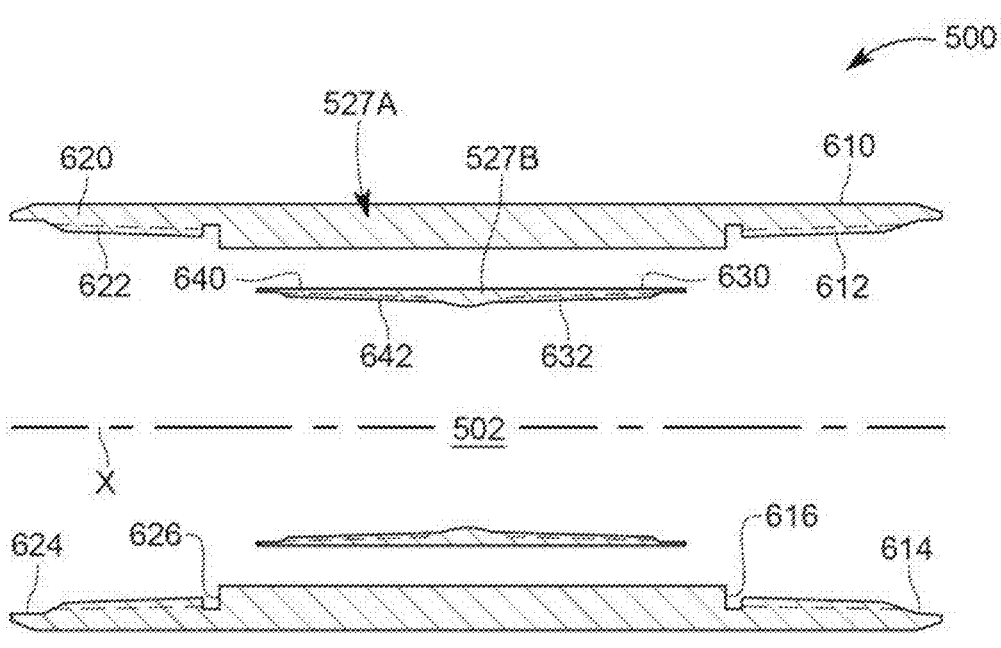
Figure 17F:
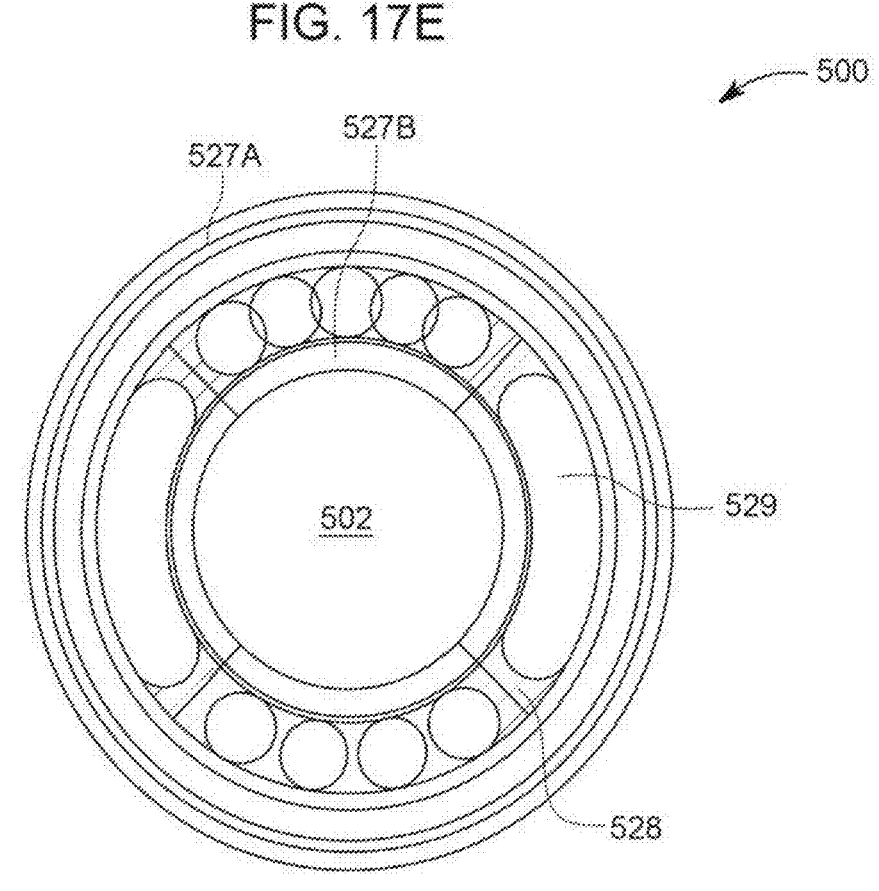

Then, in step 1608, one or more slots 529 are drilled into the material of the solid piece 501, between the outer body 527A and the inner body 527B, parallel to the bore 502 and along the longitudinal axis X, as illustrated in FIGS. 17E and 17F. These slots serve to allow a fluid from one joint pipe element to pass through the connector, along annulus B, to another joint pipe element. Note that the slots 529 can have various shapes, e.g., ovals, circles, overlapping circles, etc. Further, between adjacent slots there are portions of material of the original solid cylinder 501, which are called webs or bridges 528. Thus, the inner body 527B, the webs 528, and the outer body 527A are all part of the original solid cylinder 501. However, one skilled in the art may be inspired by this disclosure to make the inner or outer body to be a separate part and then to attach the inner body to the outer body.

Figure 18:
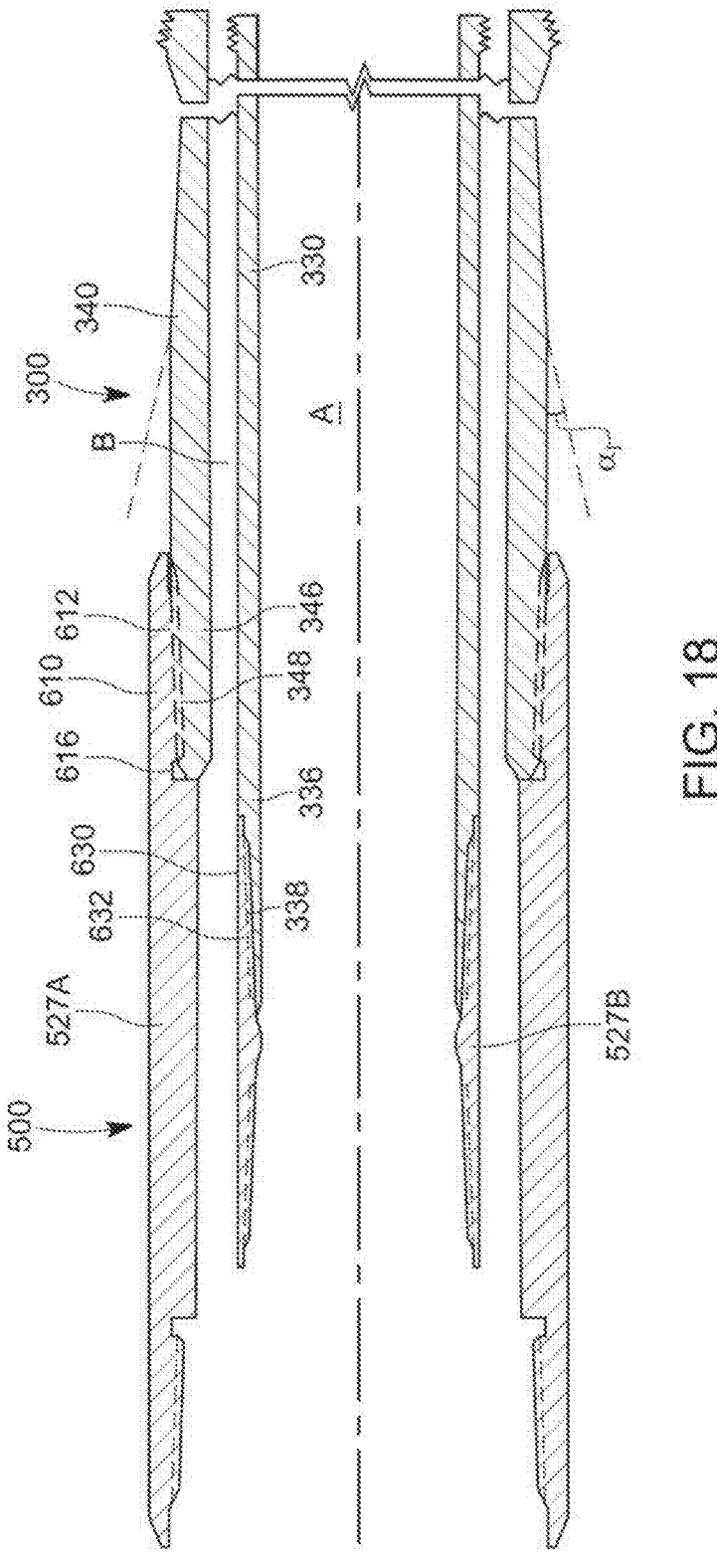
FIG. 18 illustrates a joint pipe element being engaged to connector.

FIG. 17F shows that each end of the tubular boxes 610 and 620 of the outer body 527A has a guiding portion 614 or 624 that has no threads. These guiding portions are designed to guide the outer pipes from the joint pipe elements when the connector 500 is attached to the joint pipe element. Further, FIG. 17F shows a shoulder 616 and 626 formed in the tubular boxes 610 and 620, respectively. These shoulders are designed and placed inside the outer body 527A to stop the advancement of the outer pipes of the joint pipe elements, along the longitudinal axis X, when they are attached to the connector. In other words, when a joint pipe element 300 is threaded to the connector 500, as shown in FIG. 18, the threads 348 of the tubular pin 346 of the outer pipe 340 of the joint pipe element 300 engage the threads 612 of the tubular box 610 of the outer body 527A. The tubular pin 346 advances inside the outer body 527A until the tubular pin 346 contacts the shoulder 616 (see FIG. 18), at which point the single rotational motion of the joint pipe element is completed.

At the same time, the threads 338 of the tubular pin 336 of the inner pipe 330 of the joint pipe element 300 engage the threads 632 of the tubular box 630 of the inner body 527B of the connector 500. All these threads mate simultaneously. The advancement of the tubular pin 336 stops when the tubular pin 358 contacts the shoulder 616. Thus, both threads 348 and 338 of the joint pipe element 300 thread at the same time and stop their rotational motion at the same time.

FIG. 18 also shows that the tubular pin 346 of the outer pipe 340 of the joint pipe element 300 is upset forged, i.e., its deviation angle a1 is different from zero, while the inner pipe 330 is not upset forged, i.e., its deviation angle is zero, which means that a thickness of the inner pipe is constant and the same along its entire length. The methods discussed herein may also be applied to other parts of the gas lifting system, for example, a mandrel or a pressure chamber or a pump.

Figure 19:
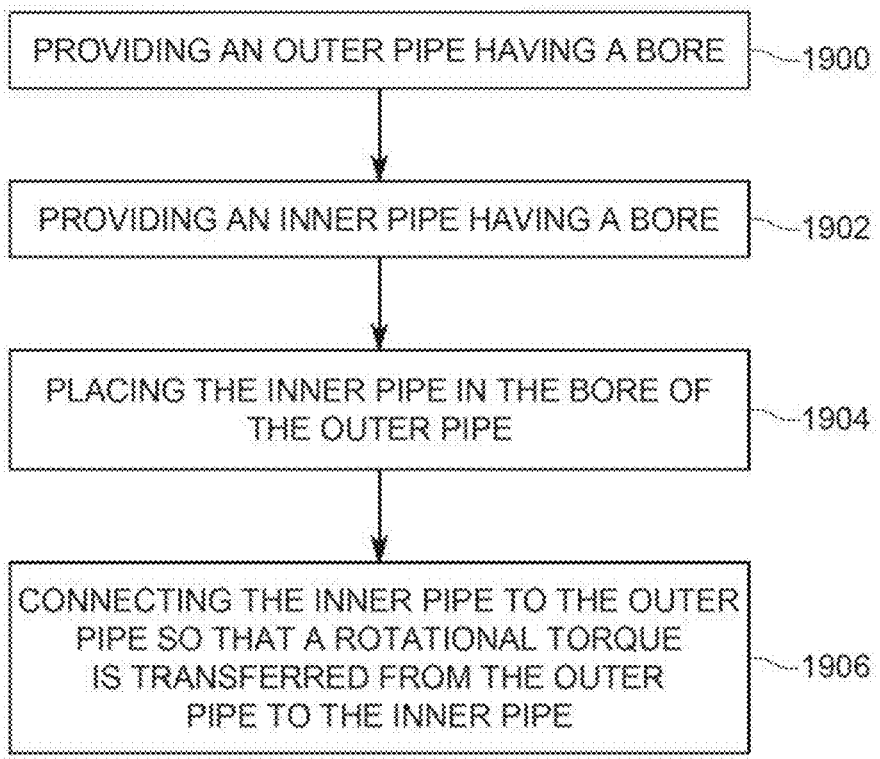
FIG. 19 is a flowchart of a method for forming a joint pipe element.

Various methods for forming the joint pipe element and also a connector are now summarized. A method for manufacturing a joint pipe element 300 of a well system is illustrated in FIG. 19. The method includes a step 1900 of providing an outer pipe 340 having a bore 341, a step 1902 of providing an inner pipe 330 having a bore 331, a step 1904 of placing the inner pipe 330 in the bore 341 of the outer pipe 340, and a step 1906 of connecting the inner pipe 330 to the outer pipe 340 so that a rotational torque is transferred from the outer pipe to the inner pipe.

In one application, a first end of the outer pipe is upset forged to have a thickness larger than a remainder of the outer pipe, and a corresponding first end of the inner pipe is not upset forged. The method may further include a step of forming first threads at the first end of the outer pipe and first treads at the first end of the inner pipe so that the first threads are synchronized. The first threads at the first end of the outer pipe are formed in an upset forged region. Furthermore, the method may include a step of attaching lugs to one of the first end of the outer pipe and the first end of the inner pipe, and a step of forming grooves in another end of the first end of the outer pipe and the first end of the inner pipe. The method may also include a step of inserting the inner pipe into the outer pipe so that the lugs slide into corresponding grooves formed into the another one of the first end of the outer pipe and the first end of the inner pipe, and/or a step of welding the lugs to the another one of the first end of the outer pipe and the first end of the inner pipe, and/or a step of inserting lugs between a second end of the outer pipe and a second end of the inner pipe, and attaching the lugs to the inner and outer pipes. Moreover, the method may also include a step of trimming the inner pipe to a desired length, and/or a step of forming second threads at the second end of the outer pipe and at the second end of the inner pipe so that the second threads are synchronized. In one application, the first end of the outer pipe is shaped as a tubular pin, the first end of inner pipe is shaped as a tubular pin, a second end of the outer pipe is shaped as a tubular pin, and a second end of the inner pipe is shaped as a tubular pin.

Figure 20:
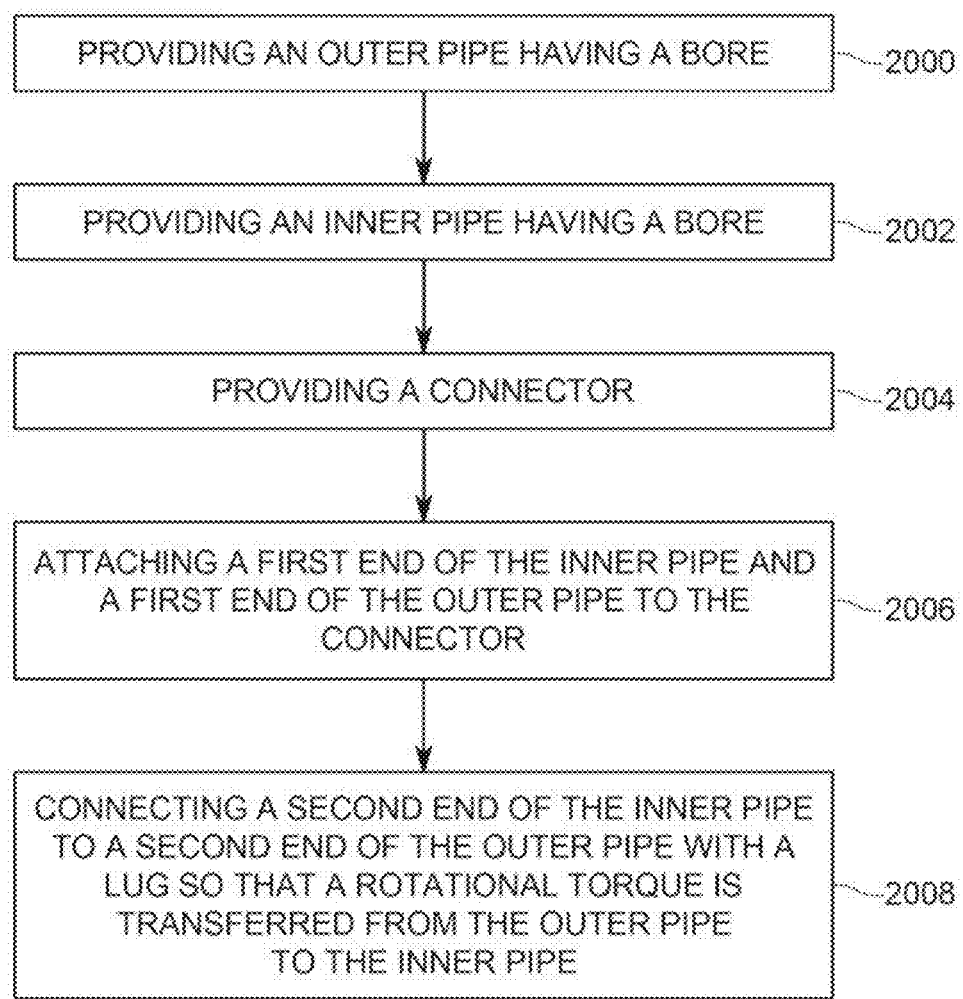
FIG. 20 is a flowchart of another method for forming a joint pipe element.

Another method for manufacturing a joint pipe element of a well system is discussed with regard to FIG. 20. The method includes a step 2000 of providing an outer pipe 340 having a bore 341, a step 2002 of providing an inner pipe 330 having a bore 331, a step 2004 of providing a connector 500, a step 2006 of attaching a first end of the inner pipe 330 and a first end of the outer pipe 340 to the connector 500, and a step 2008 of connecting a second end of the inner pipe 330 to a second end of the outer pipe 340 with a lug 360 so that a rotational torque is transferred from the outer pipe to the inner pipe.

In one application, the first end of the outer pipe is upset forged to have a thickness larger than a remainder of the outer pipe, and the corresponding first end of the inner pipe is not upset forged. In another application, the first ends of the inner and outer pipes are attached to the connector without any lug and the inner pipe is concentric to the outer pipe.

The method may also include a step of forming first threads at the first end of the outer pipe and first treads at the first end of the inner pipe so that the first threads are synchronized. It is possible that the first threads at the first end of the outer pipe are formed only in an upset forged region. The method may also include a step of attaching the lug at one of the second end of the outer pipe and the second end of the inner pipe, and forming a groove in another one of the second end of the outer pipe and the second end of the inner pipe. Further, the method may include a step of welding the lug to the another one of the second end of the outer pipe and the second end of the inner pipe, and/or a step of trimming the inner pipe to a desired length, and/or a step of forming second threads at the second end of the outer pipe and at the second end of the inner pipe so that the second threads are synchronized. The first threads and the second threads are identical. In one application, the first end of the outer pipe is shaped as a tubular pin, the first end of inner pipe is shaped as a tubular pin, a second end of the outer pipe is shaped as a tubular pin, and a second end of the inner pipe is shaped as a tubular pin.

Figure 21:
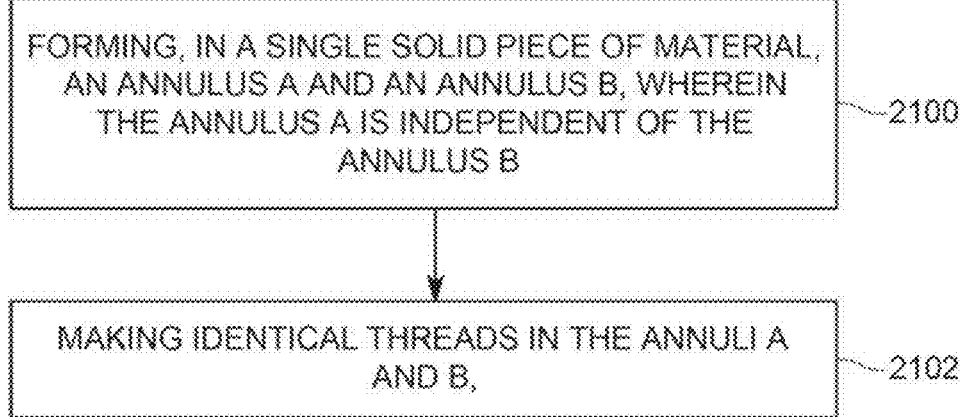
FIG. 21 is a flowchart of a method for making a connector.

A method for manufacturing a connector 500 for a well system is now discussed with regard to FIG. 21. The method includes a step 2100 of forming, in a single solid piece of material 501, an annulus A and an annulus B, wherein the annulus A is independent of the annulus B, and a step 2102 of making identical threads in the annuli A and B, where the annuli A and B are concentric.

The disclosed embodiments provide methods for manufacturing various components of an artificial gas lift system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of performing artificial lift of fluid produced from an underground formation in a wellbore, the method comprising:
  providing an outer pipe;
  providing an inner pipe having a bore;

placing the inner pipe in the bore of the outer pipe, such that an annulus is formed between an inner surface of the outer pipe and an outer surface of the inner pipe;
  forming a joint pipe element by connecting the inner pipe to the outer pipe with a connecting mechanism so that a rotational torque can be transferred from the outer pipe to the inner pipe;
  connecting a plurality of joint pipe elements to form a tubing system;
  lowering the tubing system into the wellbore; and
  pumping a pressurized gas through the tubing system to lift the fluid from the underground formation to the surface.

2. The method of claim 1, wherein a first end of the outer pipe is upset forged to have a wall thickness larger than a remainder of the wall of the outer pipe, and a corresponding first end of the inner pipe is not upset forged.

3. The method of claim 1, further comprising forming first threads at a first end of the outer pipe and first threads at a first end of the inner pipe so that the first threads are synchronized.

4. The method of claim 3, wherein the first threads at the first end of the outer pipe are formed in an upset forged region.

5. The method of claim 1, further comprising attaching a lug to one of a first end of the outer pipe and a first end of the inner pipe, wherein the lug is part of the connecting mechanism.

6. The method of claim 5, further comprising inserting the inner pipe into the outer pipe so that the lug slides into a corresponding groove formed into the another one of the first end of the outer pipe and the first end of the inner pipe.

7. The method of claim 6, further comprising welding the lug to the another one of the first end of the outer pipe and the first end of the inner pipe.

8. The method of claim 7, further comprising:
  inserting another lug between a second end of the outer pipe and a second end of the inner pipe; and
  attaching the another lug to the inner and outer pipes.

9. The method of claim 8, further comprising trimming the inner pipe to a desired length.

10. The method of claim 9, further comprising forming threads at the second end of the outer pipe and at the second end of the inner pipe so that the threads are synchronized.

11. The method of claim 1, wherein a first end of the outer pipe is shaped as a tubular pin, a first end of inner pipe is shaped as a tubular pin, a second end of the outer pipe is shaped as a tubular pin, and a second end of the inner pipe is shaped as a tubular pin.

12. The method of claim 1, wherein the outer pipe is concentric to the inner pipe.

13. The method of claim 1, wherein the connecting mechanism further comprises a bridge attaching the inner pipe to the outer pipe.

14. The method of claim 13, wherein the bridge comprises holes.

15. The method of claim 1, in which the pressurized gas is pumped through the bore of the inner pipe, such that the fluid flows to the surface through the annulus.

16. The method of claim 1, in which the pressurized gas is pumped through the annulus, such that the fluid flows to the surface through the bore of the inner pipe.

\* \* \* \* \*